US012586928B2

(12) United States Patent
Ueda et al.

(10) Patent No.: US 12,586,928 B2
(45) Date of Patent: Mar. 24, 2026

(54) ANTENNA DEVICE AND COMMUNICATION DEVICE

(71) Applicant: Murata Manufacturing Co., Ltd., Nagaokakyo (JP)

(72) Inventors: Hideki Ueda, Nagaokakyo (JP); Takaya Nemoto, Nagaokakyo (JP); Kengo Onaka, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 28 days.

(21) Appl. No.: 18/619,207

(22) Filed: Mar. 28, 2024

(65) Prior Publication Data

US 2024/0243488 A1 Jul. 18, 2024

Related U.S. Application Data

(63) Continuation of application No. PCT/JP2022/033462, filed on Sep. 6, 2022.

(30) Foreign Application Priority Data

Sep. 28, 2021 (JP) ................................ 2021-157780

(51) Int. Cl.
*H01Q 21/29* (2006.01)
*H01Q 13/02* (2006.01)
(Continued)

(52) U.S. Cl.
CPC ............. *H01Q 21/29* (2013.01); *H01Q 13/02* (2013.01); *H01Q 21/08* (2013.01); *H01Q 21/24* (2013.01)

(58) Field of Classification Search
CPC ........ H01Q 21/29; H01Q 13/02; H01Q 21/08; H01Q 21/24; H01Q 1/243
See application file for complete search history.

(56) References Cited

U.S. PATENT DOCUMENTS 7,460,060 B2 * 12/2008 Aoki ........................ G01S 13/89 342/368
10,418,723 B1 * 9/2019 Livadaru .................. H01Q 1/38
(Continued)

FOREIGN PATENT DOCUMENTS

JP 2009-141961 A 6/2009
JP 2014-529971 A 11/2014
(Continued)

OTHER PUBLICATIONS

Notice of Reasons for Refusal mailed Dec. 17, 2024, in Japanese Application No. 2023-550499, 3 pages.
(Continued)

*Primary Examiner* — Hai V Tran
(74) *Attorney, Agent, or Firm* — XSENSUS LLP

(57) ABSTRACT

An array accommodated in a housing includes multiple antenna elements. The antenna elements face an inside surface of the housing and are arrayed in a first direction at least one-dimensionally. A waveguide is coupled to the antenna elements of the array antenna and extends from the array antenna toward the inside surface of the housing. The waveguide has a housing-side end face facing the inside surface of the housing and an antenna-side end face facing the array antenna. A length from one end to an opposite end of the housing-side end face in the first direction is greater than a length from one end to an opposite end of the antenna-side end face in the first direction. An antenna device that can improve antenna gain without increasing the size of the antenna module is provided.

20 Claims, 17 Drawing Sheets

(51) Int. Cl.
*H01Q 21/08* (2006.01)
*H01Q 21/24* (2006.01)
*H01Q 21/28* (2006.01)

(56) References Cited

U.S. PATENT DOCUMENTS

| | | | | |
|---|---|---|---|---|
| 2009/0303147 | A1 | 12/2009 | Choudhury | |
| 2018/0358686 | A1 | 12/2018 | Park | |
| 2019/0312347 | A1 | 10/2019 | Edwards et al. | |
| 2020/0227821 | A1* | 7/2020 | Wu | H01Q 1/38 |
| 2021/0075105 | A1* | 3/2021 | Kashino | H01Q 19/06 |

FOREIGN PATENT DOCUMENTS

| | | | |
|---|---|---|---|
| JP | 2015-213285 | A | 11/2015 |
| JP | 2016-523024 | A | 8/2016 |
| JP | 2018-523351 | A | 8/2018 |
| JP | 2021-069109 | A | 4/2021 |
| WO | 2020/066453 | A1 | 4/2020 |

OTHER PUBLICATIONS

International Search Report and Written Opinion mailed on Nov. 29, 2022, received for PCT Application PCT/JP2022/033462, filed on Sep. 6, 2022, 14 pages including English Translation.
Notice of Reasons for Refusal mailed Aug. 20, 2024, in Japanese Application No. 2023-550499, 8 pages. (With English Translation).
Office Action issued on Nov. 25, 2025, in corresponding Japanese patent Application No. 2025-037454, 4 pages.

* cited by examiner

ANTENNA DEVICE AND COMMUNICATION DEVICE

CROSS-REFERENCE TO RELATED APPLICATIONS

This is a continuation application of PCT/JP2022/033462 filed on Sep. 6, 2022, designating the United States of America, which is based on and claims priority to Japanese Patent Application No. JP 2021-157780 filed on Sep. 28, 2021. The entire contents of the above-identified applications, including the specifications, drawings and claims, are incorporated herein by reference in their entirety.

TECHNICAL FIELD

The present disclosure relates to an antenna device and to a communication device.

BACKGROUND ART

Patent Document 1 below discloses an antenna device in which a dielectric spacer is disposed between a dielectric cover layer and a substrate on which an array antenna is disposed. A conductive layer is disposed so as to surround a region of the inside surface of the dielectric cover layer, the region facing the dielectric spacer. Vertical conductive structures are disposed at sidewalls of the dielectric spacer. Radio waves emitted by the array antenna pass through the dielectric spacer and the dielectric cover layer and are radiated to the outside. The antenna device provides a favorable radiation pattern because the conductive layer blocks surface waves.

CITATION LIST

Patent Document

Patent Document 1: U.S. patent Application Publication No. 2019/0312347

SUMMARY OF DISCLOSURE

Technical Problem

An improvement in gain of an array antenna is desired. The gain of the array antenna can be improved by increasing the area of the array antenna. On the other hand, the size reduction of an antenna module having the array antenna and the substrate is desired. Increasing the area of the array antenna for improving the gain contradicts the size reduction of the antenna module.

Accordingly, an object of the present disclosure is to provide an antenna device that can improve antenna gain without increasing the size of the antenna module. Another object of the present disclosure is to provide a communication device on which the antenna device is mounted.

Solution to Problem

According to an aspect of the present disclosure, an antenna device includes a housing, an array antenna, and a waveguide. The array antenna is accommodated in the housing so as to face an inside surface of the housing and includes multiple antenna elements that are arrayed in a first direction at least one-dimensionally. The waveguide is coupled to the antenna elements of the array antenna and extends from the array antenna toward the inside surface of the housing. The waveguide has a housing-side end face facing the inside surface of the housing and an antenna-side end face facing the array antenna. A length from one end to an opposite end of the housing-side end face in the first direction is greater than a length from one end to an opposite end of the antenna-side end face in the first direction.

According to another aspect of the present disclosure, an antenna device includes a housing, an array antenna, and multiple waveguides. The array antenna is accommodated in the housing so as to face an inside surface of the housing and includes multiple antenna elements that are arrayed in a first direction at least one-dimensionally. The waveguides are coupled to respective ones of the antenna elements of the array antenna and extend from the respective ones of the antenna elements toward the inside surface of the housing. In two of the waveguides coupled to respective two of the antenna elements that are positioned adjacently to each other in the first direction, a gap in the first direction between the housing-side end faces of the two of the waveguides is larger than a gap in the first direction between the antenna-side end faces thereof.

According to a still another aspect of the present disclosure, a communication device includes the antenna device and a high-frequency integrated circuit that is accommodated in the housing of the antenna device and configured to supply high-frequency signals to the antenna elements of the array antenna.

Advantageous Effects of Disclosure

The end face of the waveguide that faces the inside surface of the housing serves as a source of secondary waves. The length in the first direction between one end and the opposite end of the end face of the waveguide serving as the source of secondary waves is greater than the length between one end and the other end of the antenna-side end face in the first direction. As a result, the effective area of the antenna element is expanded, which can improve antenna gain without increasing the actual dimensions of the array antenna.

DESCRIPTION OF EMBODIMENTS

First Embodiment

An antenna device according to a first embodiment will be described with reference to FIGS. 1A and 1B.

Figure 1A:
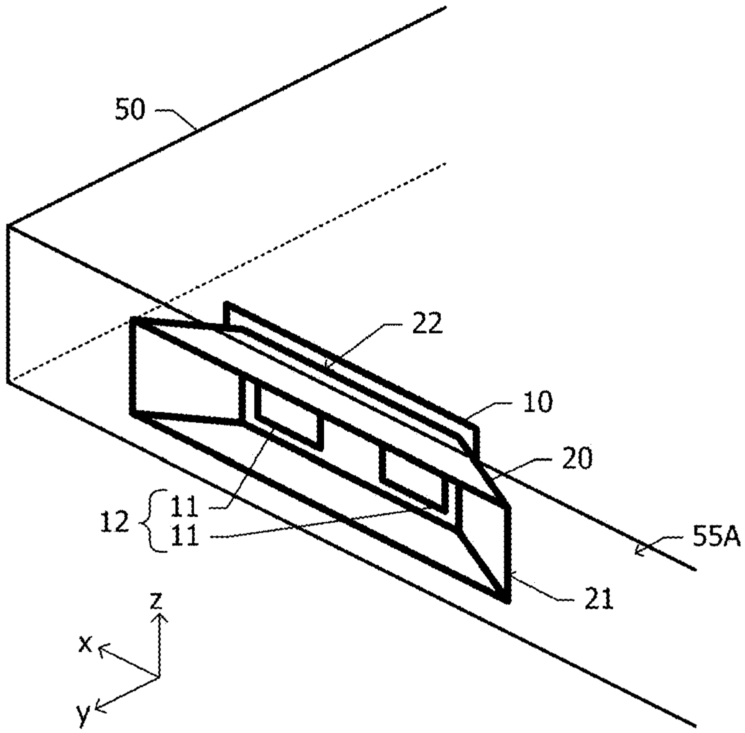
FIG. 1A is a perspective view illustrating part of an antenna device according to a first embodiment.
Figure 1B:
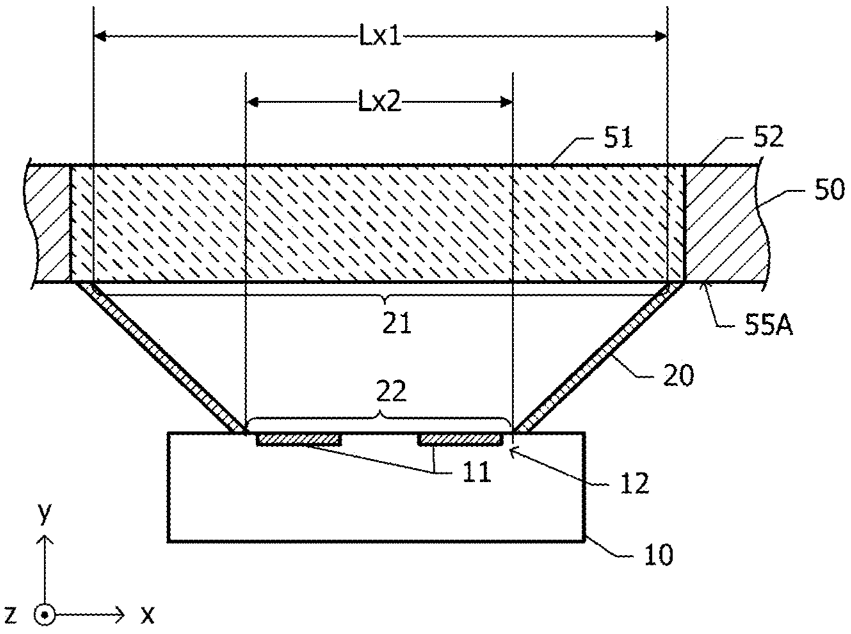
FIG. 1B is a cross-sectional view illustrating part of the antenna device.

FIG. 1A is a perspective view illustrating part of the antenna device of the first embodiment, and FIG. 1B is a cross-sectional view illustrating part of the antenna device. A substrate 10 is accommodated in a housing 50, and multiple antenna elements 11, for example, two antenna elements 11, are disposed at the substrate 10. The antenna elements 11 are arrayed one-dimensionally so as to oppose a first region 55A of the inside surface of the housing 50. Thus, the antenna elements 11 forms an array antenna 12. In an x-y-z orthogonal coordinate system, the x direction is defined as the direction in which the antenna elements 11 are arranged side-by-side, and the y direction is defined as the direction normal to the first region 55A. The direction in which the antenna elements 11 face the first region 55A is referred to as the "positive direction" along the y-axis.

A waveguide 20 is coupled to the array antenna 12. The waveguide 20 extends from the array antenna 12 toward the first region 55A. The term "to couple" as used above means "electromagnetic connection", in other words, an electromagnetic field or electromagnetic waves flow from the array antenna 12 into the waveguide 20 or vice versa. More specifically, one waveguide 20 is coupled to multiple antenna elements 11. The cross section of the waveguide 20 taken in a direction orthogonal to the y-axis gradually expands in the x direction as the cross section comes closer to the first region 55A from the array antenna 12. The dimension of the cross section of the waveguide 20 in the z direction is constant. Note that the waveguide 20 may be shaped such that the cross section gradually expands both in the x direction and in the z direction as the cross section comes closer to the first region 55A from the array antenna 12.

Assuming the array antenna 12 is viewed in the y direction, the antenna elements 11 are encompassed by an end face 22 of the waveguide 20, the end face 22 positioned near the array antenna 12 (which may be referred to herein as the "antenna-side end face"). The waveguide 20 has the other end face positioned near the first region 55A of the inside surface of the housing 50 (which may be referred to herein as the "housing-side end face"). Lx1 denotes the dimension of the housing-side end face 21 in the x direction, and Lx2 denotes the dimension of the antenna-side end face 22 in the x direction. The dimension Lx1 can be otherwise defined as the length between one end and the opposite end of the housing-side end face 21 of the waveguide 20 in the x direction. Similarly, the dimension Lx2 can be otherwise defined as the length between one end and the opposite end of the antenna-side end face 22 of the waveguide 20 in the x direction.

Lx1>Lx2 holds in the first embodiment. Accordingly, the area of the housing-side end face 21 of the waveguide 20 is greater than the area of the antenna-side end face 22. An example of the waveguide 20 is a metallic waveguide. The term "end face" of the waveguide 20 here means the opening at each end of the metallic waveguide. The interior space defined by the metallic waveguide is filled with air.

A transmission window 51 is formed in the housing 50. The transmission window 51 is made of a dielectric and formed so as to encompass the housing-side end face 21 of the waveguide 20 assuming the first region 55A is viewed in plan. The transmission window 51 of the housing 50 is surrounded by a metal wall 52 of the housing 50. Radio waves emitted by the array antenna 12 pass through the waveguide 20 and further through the transmission window 51 and radiate out of the housing 50.

Next, advantageous effects of the antenna device according to the first embodiment are described.

In the antenna device of the first embodiment, the antenna-side end face 22 of the waveguide 20 encompasses multiple antenna elements 11. In other words, the area of the antenna-side end face 22 is greater than the area of a convex hull encompassing the antenna elements 11 (which may be referred to simply as the "area of the array antenna 12"). The term "convex hull" as used above refers a smallest polygon that encompasses the antenna elements 11. Moreover, the area of the housing-side end face 21 of the waveguide 20 is greater than the area of the antenna-side end face 22. The antenna elements 11 serve as a source of primary waves, and the housing-side end face 21 of the waveguide 20 serves as a source of secondary waves. More specifically, points on the housing-side end face 21 of the waveguide 20 serve as secondary-wave sources in accordance with the Huygens-Fresnel principle. The area of the end face 21 operating as the source of secondary waves is greater than the area of the array antenna 12, which provides higher antenna gain compared with the case in which the array antenna 12 operates without using the waveguide 20.

Moreover, this enables size reduction of the antenna module having the array antenna 12 and the substrate 10 since the area of the array antenna 12 is smaller than the area of the housing-side end face 21 of the waveguide 20.

Next, a variation of the first embodiment is described with reference to FIG. 2.

Figure 2:
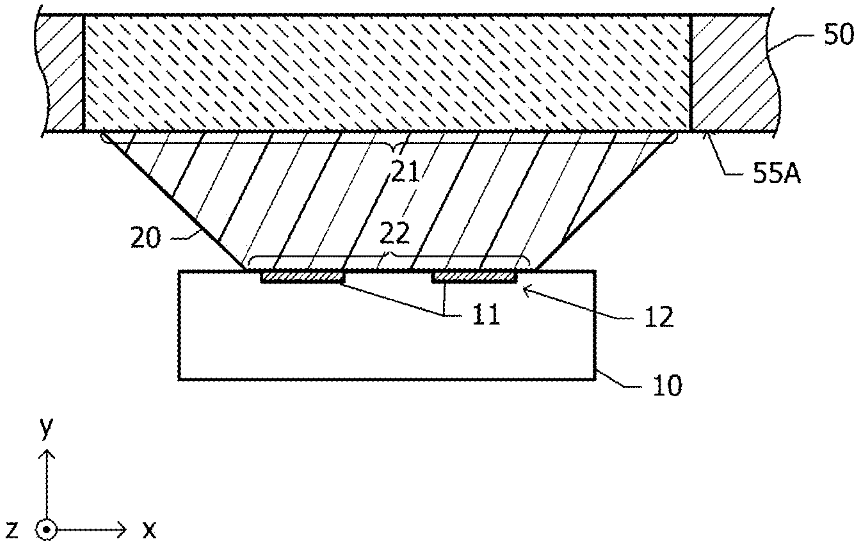
FIG. 2 is a cross-sectional view illustrating an antenna device according to a variation of the first embodiment.

FIG. 2 is a cross-sectional view illustrating an antenna device according to the variation of the first embodiment. In the first embodiment, as illustrated in FIGS. 1A and 1B, the waveguide 20 is the metallic waveguide. In the variation illustrated in FIG. 2, on the other hand, the waveguide 20 is a dielectric waveguide. The end face of the dielectric waveguide that faces the first region 55A corresponds to the housing-side end face 21 of the waveguide 20, and the end face of the dielectric waveguide that faces the array antenna 12 corresponds to the antenna-side end face 22.

The dielectric constant of the dielectric material of the waveguide 20 is greater than the dielectric constant of the spaces adjoining respective side surfaces of the waveguide 20. The waveguide 20 of the variation illustrated in FIG. 2, which is formed as the dielectric waveguide, provides similar advantageous effects as described in the first embodiment.

In the first embodiment, the space inside the waveguide 20 that is the metallic waveguide is filled with air. The space, however, may be filled with a dielectric material. The following describes the advantageous effects of the waveguide 20 filled with the dielectric material.

The relative dielectric constant of the dielectric material used for the substrate 10 or the like on which the array antenna 12 is disposed is generally 2 or more and 8 or less. The relative dielectric constant of the dielectric material used for the transmission window 51 of the housing 50 is generally 3 or more and 10 or less. In the case of the metallic waveguide being filled with air, the relative dielectric constant of the space inside the metallic waveguide is 1. As a result, the impedance mismatch becomes greater at the antenna-side end face 22 and at the housing-side end face 21 of the waveguide 20. Filling the space inside the metallic waveguide with the dielectric material leads to a reduction in the impedance mismatch. It is effective to set the dielectric constant of the dielectric material in the metallic waveguide to an intermediate value between the dielectric constant of the substrate 10 and the dielectric constant of the transmission window 51.

In addition, the dielectric material inside the metallic waveguide serves as a heat transfer path from the substrate 10 to the housing 50. In the case of a heat source, such as a high-frequency integrated circuit, being mounted on the substrate 10, this improves the characteristics of heat dissipation from the heat source to the housing 50.

Next, another variation of the first embodiment is described.

In the antenna device of the first embodiment, the array antenna 12 is the one-dimensional array antenna in which multiple antenna elements 11 are arrayed in the x direction. The array antenna 12, however, may be a two-dimensional array antenna in which multiple antenna elements 11 are arrayed two-dimensionally. For example, the antenna elements 11 may be arrayed on a matrix in the x-z plane. In this case, the antenna-side end face 22 of the waveguide 20 is disposed so as to encompass the antenna elements 11. The waveguide 20 may be shaped such that the cross section of the waveguide 20 taken in the direction orthogonal to the y-axis expand gradually as the cross section comes closer to the housing-side end face 21 from the antenna-side end face 22. For example, the waveguide 20 may be shaped like a truncated quadrangular pyramid.

In the antenna device of the first embodiment, the dielectric transmission window 51 is disposed so as to serve as a part of the metal wall 52 of the housing 50. The metal wall 52, however, may be entirely made of a dielectric. This provides greater freedom in positioning the waveguide 20 relative to the housing 50.

With reference to FIGS. 3A to 8B, the following describes specific examples for fixing the waveguide 20 and the substrate 10 in the antenna device according to the first embodiment and to the variation thereof. FIGS. 3A to 8B are cross-sectional views illustrating more specific structures of the antenna device of the first embodiment and of the variation thereof.

Figure 3A:
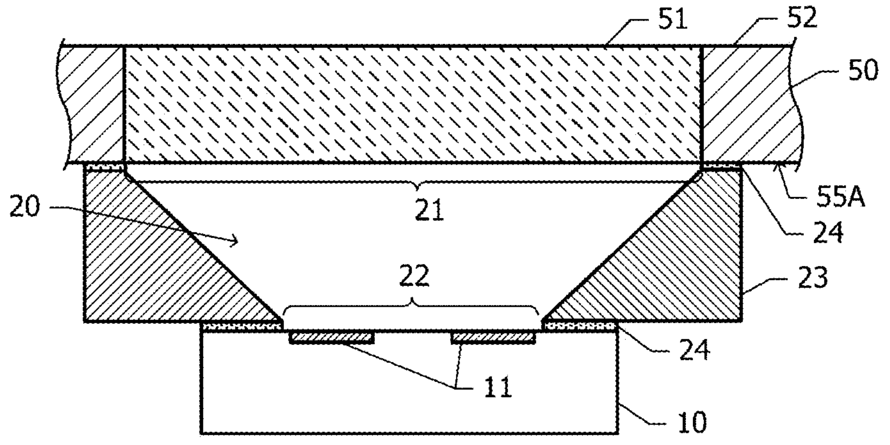
FIG. 3A, FIG. 3B, and FIG. 3C are cross-sectional views illustrating specific structures of the antenna device of the first embodiment and of the variation thereof.

In the example illustrated in FIG. 3A, the waveguide 20 is shaped as a cavity piercing through a conductive member 23. The surface of the conductive member 23 that faces the first region 55A is fixed to the inside surface of the housing 50 with an adhesion layer 24 interposed therebetween. The substrate 10 on which the antenna elements 11 are disposed is fixed to the conductive member 23 with the adhesion layer 24 interposed therebetween. For example, the adhesion layer 24 may be made of an adhesive or a double-sided adhesive tape. In the case in which the circumference of the housing-side end face 21 of the waveguide 20 is substantially aligned with the circumference of the transmission window 51 made of a dielectric, the metal wall 52 of the housing 50 can also serve as a waveguide that is connected to the waveguide 20.

Figure 3B:
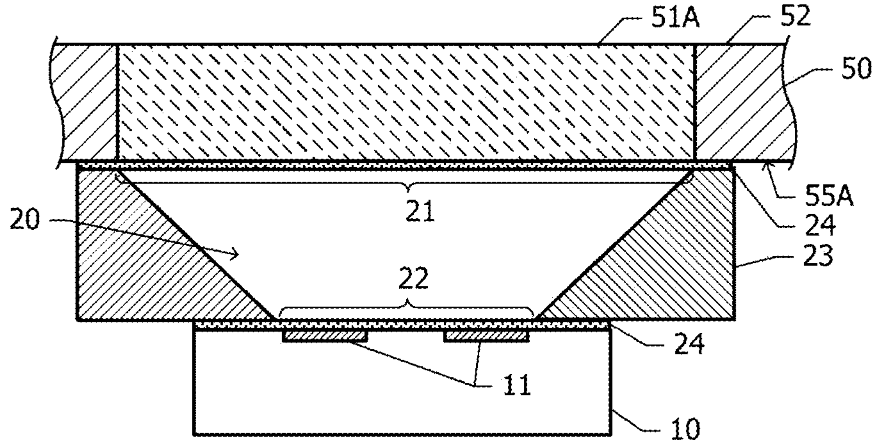

In the example illustrated in FIG. 3B, the adhesion layer 24 is also present in regions corresponding to the housing-side end face 21 and the antenna-side end face 22 of the waveguide 20, which are the openings of the waveguide 20. In the example illustrated in FIG. 3B, an adhesive can be applied, for example, on the inside surface of the housing 50 and also on the substrate 10. In this case, the application area of the adhesive is not necessarily adjusted precisely for the adhesion of the conductive member 23, which simplifies the process of manufacturing. In the case of a double-sided adhesive tape being used for the adhesion layer 24, it is not necessary to cut out the double-sided adhesive tape for the housing-side end face 21 and the antenna-side end face 22 of the waveguide 20, which simplifies the process of manufacturing.

Figure 3C:
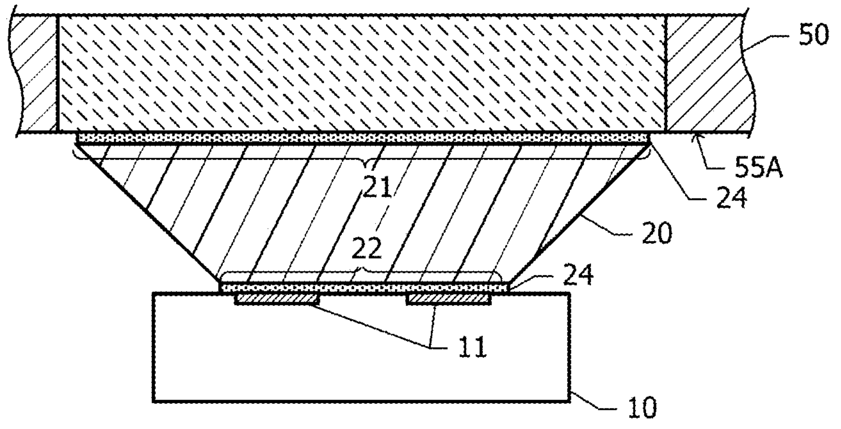

In the example illustrated in FIG. 3C, the waveguide 20 is the dielectric waveguide. An end face 21 of the dielectric waveguide is fixed to the first region 55A of the inside surface of the housing 50 with the adhesion layer 24 interposed therebetween. The substrate 10 is fixed to the other end face 22 of the dielectric waveguide with the adhesion layer 24 interposed therebetween.

Figure 4A:
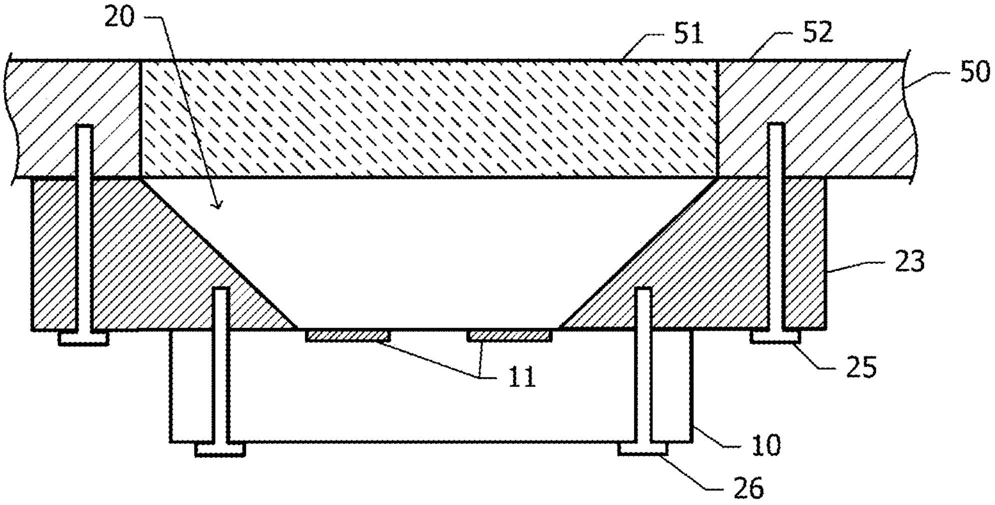
FIG. 4A and FIG. 4B are cross-sectional views illustrating specific structures of the antenna device of the first embodiment and of the variation thereof.

In the example illustrated in FIG. 4A, the conductive member 23 that defines the waveguide 20 is fixed to the metal wall 52 of the housing 50 using screws 25. The substrate 10 is fixed to the conductive member 23 using screws 26. The metal wall 52 of the housing 50 and the conductive member 23 may be made of the same metal or of different metals. The conductive member 23 may be formed as an integral part of the metal wall 52 of the housing 50. In this case, the screws 25 are not necessary.

Figure 4B:
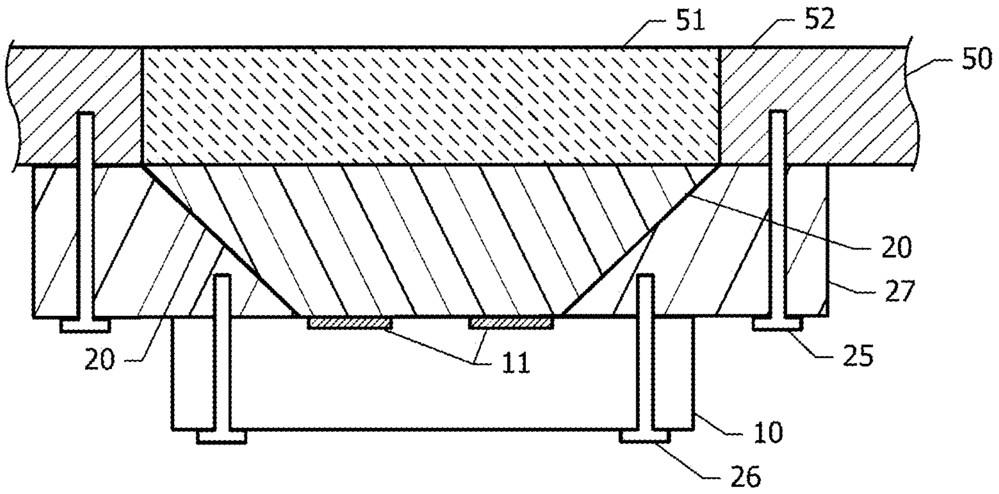

In the example illustrated in FIG. 4B, the waveguide 20 is the dielectric waveguide. A dielectric-waveguide support member 27 is in contact with the side surfaces of the waveguide 20. The dielectric constant of the dielectric-waveguide support member 27 is smaller than that of the dielectric material of the waveguide 20. The dielectric-waveguide support member 27 surrounds the side surfaces of the waveguide 20. The dielectric-waveguide support member 27 is fixed to the metal wall 52 of the housing 50 using the screws 25. The substrate 10 is fixed to the dielectric-waveguide support member 27 using the screws 26.

Figure 5A:
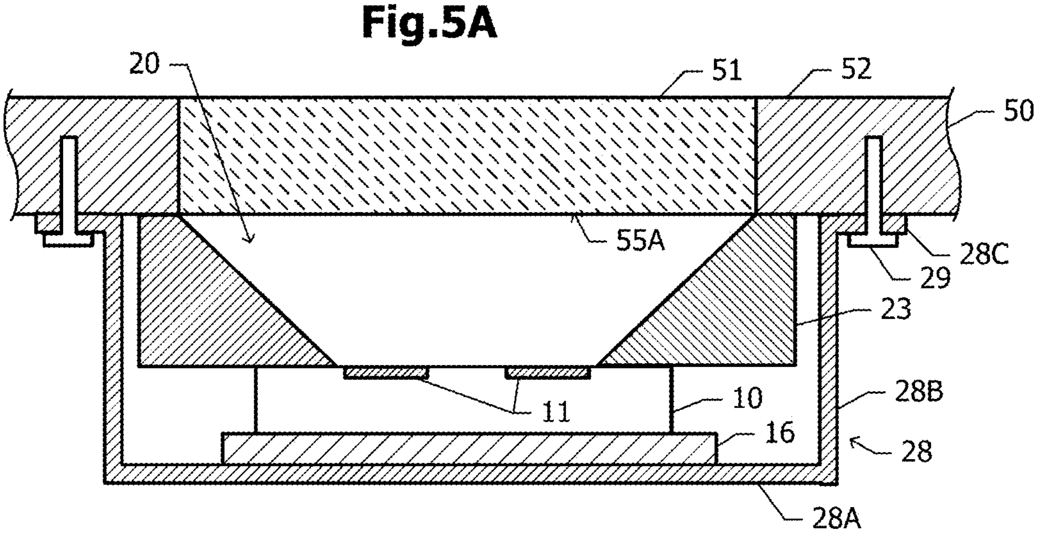
FIG. 5A, FIG. 5B, and FIG. 5C are cross-sectional views illustrating specific structures of the antenna device of the first embodiment and of the variation thereof.

In the example illustrated in FIG. 5A, the conductive member 23 defining the waveguide 20, the substrate 10, and a heat-dissipating member 16 are fixed to the housing 50 using a fixation member 28. The fixation member 28 includes a bottom portion 28A, a side-wall portion 28B, and a mounting portion 28C. For example, the fixation member 28 is made of metal. The conductive member 23, the substrate 10, the heat-dissipating member 16, and the bottom portion 28A are stacked in this order from the first region 55A of the inside surface of the housing 50. The side-wall portion 28B extends from the edges of the bottom portion 28A toward the first region 55A. The mounting portion 28C is formed at the end of the side-wall portion 28B. The mounting portion 28C is bent outward so as to have a shape like the letter L. The mounting portion 28C is fixed to the metal wall 52 of the housing 50 using screws 29.

The conductive member 23, the substrate 10, and the heat-dissipating member 16 are pressed against the first region 55A by the fixation member 28 and thereby fixed to the housing 50 by frictional force. The fixation member 28 and the screws 29 serve as a support portion by which the housing 50 supports the waveguide 20, the substrate 10, and the heat-dissipating member 16. In place of the screws 29, other fixation devices may be used to mechanically fixes the fixation member 28 to the housing 50. Heat is conducted from the substrate 10 to the metal wall 52 of the housing 50 through the heat-dissipating member 16 and the fixation member 28. The outside surface of the conductive member 23 may be in contact with the side-wall portion 28B of the fixation member 28, which can further improve the heat dissipation.

Figure 5B:
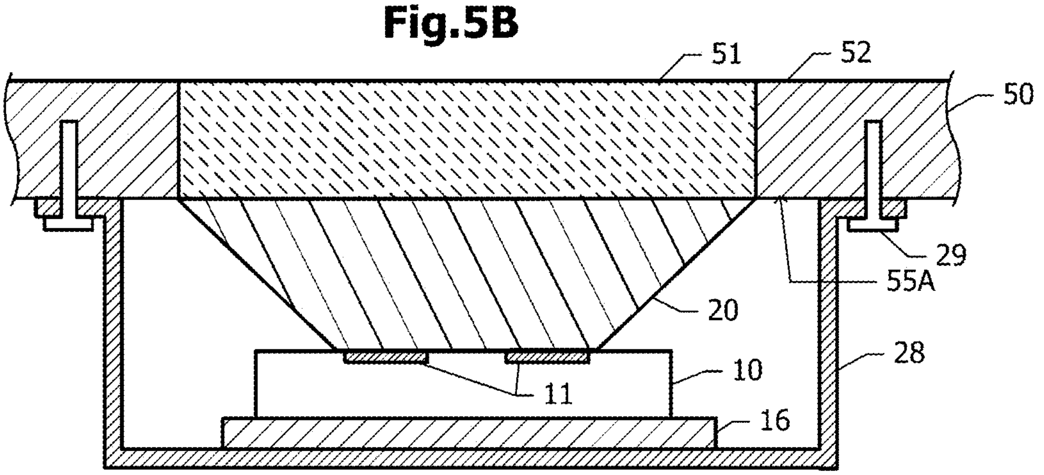

In the example illustrated in FIG. 5B, the waveguide 20 formed as the dielectric waveguide is used instead of the waveguide 20 defined by the conductive member 23 illustrated in the example of FIG. 5A. Other configurations are the same as those illustrated in the example of FIG. 5A.

Figure 5C:
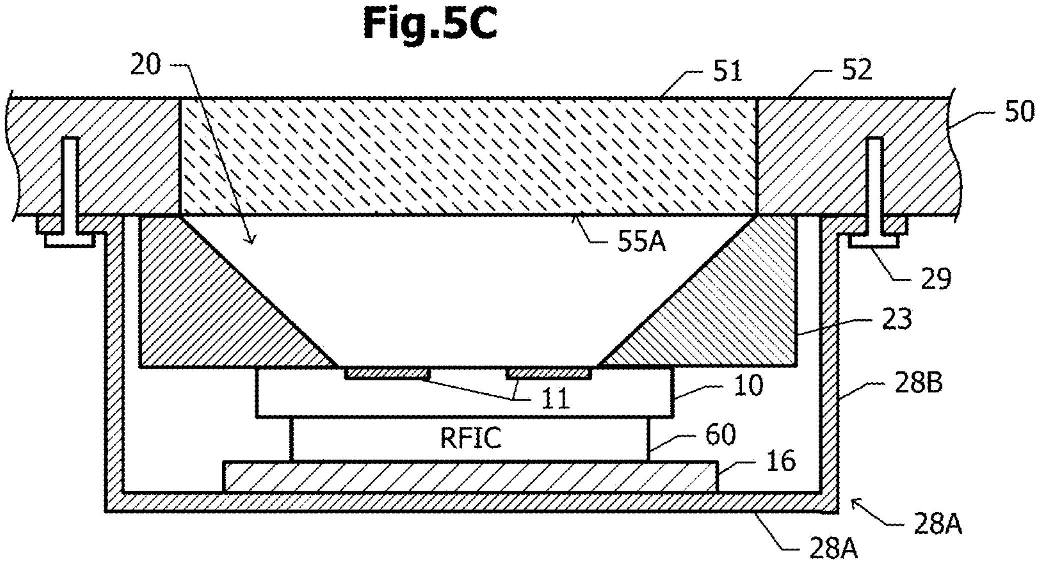

In the example illustrated in FIG. 5C, a high-frequency integrated circuit 60 is mounted on a surface of the substrate 10 of the example illustrated in FIG. 5A, the surface being opposite to the waveguide 20. The heat-dissipating member 16 is disposed between the high-frequency integrated circuit 60 and the bottom portion 28A of the fixation member 28. Note that the waveguide 20 can be the dielectric waveguide illustrated in FIG. 5B. In the structure illustrated in FIG. 5C, the heat generated by the high-frequency integrated circuit 60 is dissipated to the housing 50 through the heat-dissipating member 16 and the fixation member 28. A system-in-package (SiP) device having a high-frequency integrated circuit and other components formed therein may be used in place of the high-frequency integrated circuit 60.

Figure 6A:
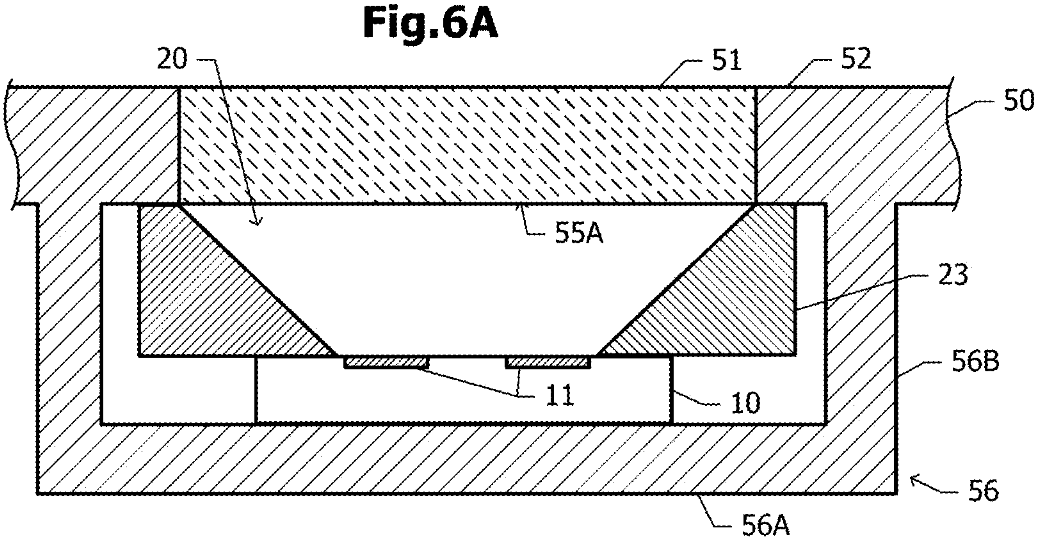
FIG. 6A, FIG. 6B, and FIG. 6C are cross-sectional views illustrating specific structures of the antenna device of the first embodiment and of the variation thereof.

In the example illustrated in FIG. 6A, a support portion 56 is used in place of the fixation member 28 of the example illustrated in FIG. 5A. The support portion 56 is formed as an integral part of the metal wall 52 of the housing 50. The support portion 56 includes a bottom portion 56A and a side-wall portion 56B. The bottom portion 56A is positioned so as to face the first region 55A with a gap interposed therebetween, and the side-wall portion 56B extends from the edges of the bottom portion 56A toward the metal wall 52. The conductive member 23 and the substrate 10 defining the waveguide 20 are interposed between the first region 55A and the bottom portion 56A. Note that a heat-dissipating member may be disposed between the substrate 10 and the bottom portion 56A.

Figure 6B:
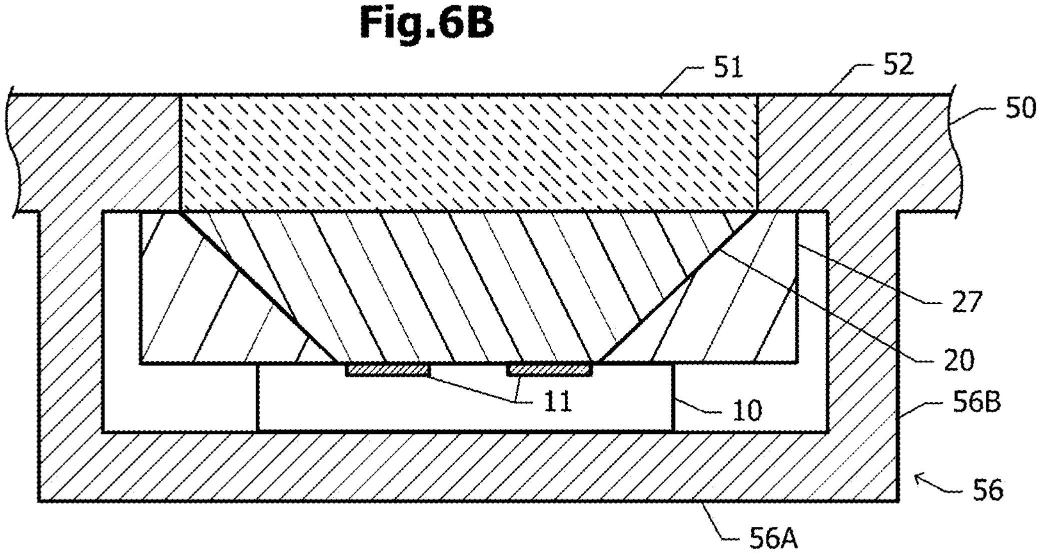

In the example illustrated in FIG. 6B, the dielectric waveguide is used in place of the waveguide 20 defined by the conductive member 23 of the example illustrated in FIG. 6A. The dielectric-waveguide support member 27 of the example illustrated in FIG. 4B is disposed at the side of the waveguide 20. A heat-dissipating member may be disposed between the substrate 10 and the bottom portion 56A in the example illustrated in FIG. 6B.

Figure 6C:
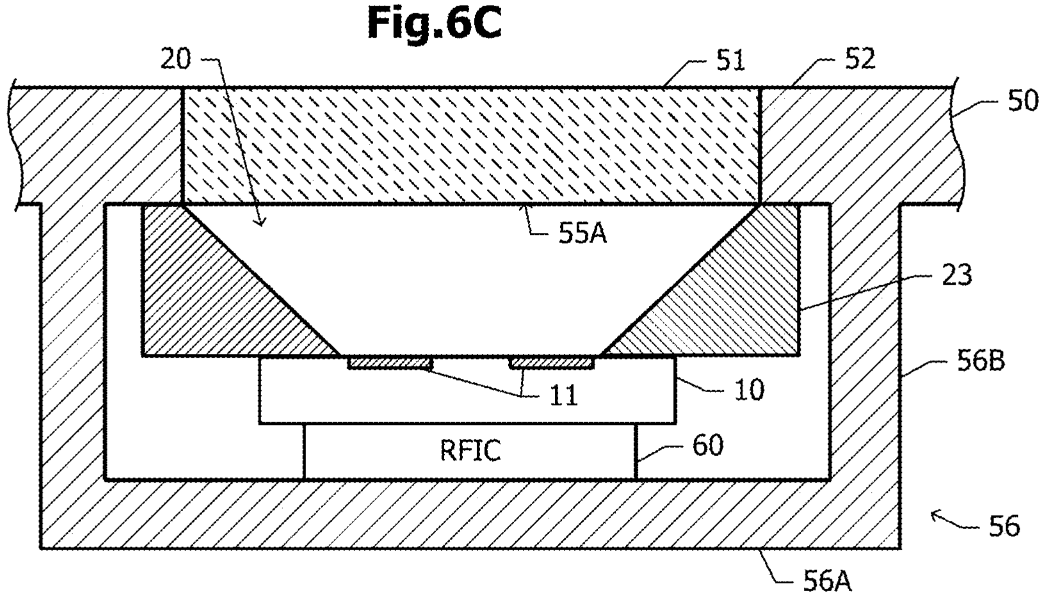

In the example illustrated in FIG. 6C, the high-frequency integrated circuit 60 is mounted on a surface of the substrate 10 of the example illustrated in FIG. 6A, the surface being opposite to the waveguide 20. Note that the waveguide 20 can be the dielectric waveguide illustrated in FIG. 6B. In the structure illustrated in FIG. 6C, the heat generated by the high-frequency integrated circuit 60 is dissipated to the housing 50 through the support portion 56. The system-in-package (SiP) device having a high-frequency integrated circuit and other components formed therein may be used in place of the high-frequency integrated circuit 60. Note that a heat-dissipating member may be provided between the high-frequency integrated circuit 60 and the bottom portion 56A.

Figure 7:
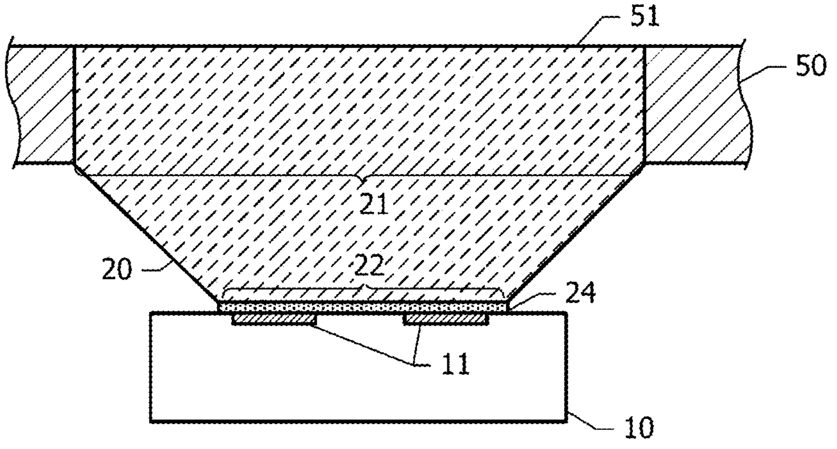
FIG. 7 is a cross-sectional view illustrating a specific structure of the antenna device of the variation of the first embodiment.

In the example illustrated in FIG. 7, the waveguide 20 is the dielectric waveguide, and the waveguide 20 and the transmission window 51 of the housing 50 are formed integrally. For example, the waveguide 20 and the transmission window 51 are made of the same dielectric material. The waveguide 20 and the transmission window 51 may be made of different dielectric materials. The substrate 10 is fixed to the antenna-side end face 22 of the waveguide 20 with the adhesion layer 24 interposed therebetween.

Figure 8A:
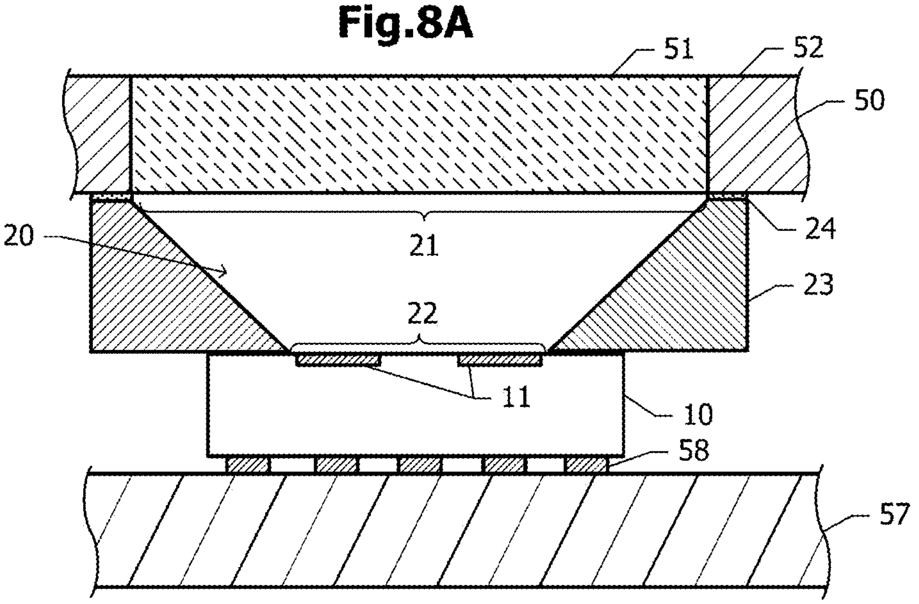
FIG. 8A and FIG. 8B are cross-sectional views illustrating specific structures of the antenna device of the first embodiment.

In the example illustrated in FIG. 8A, the conductive member 23 defining the waveguide 20 is fixed to the inside surface of the housing 50 with the adhesion layer 24 interposed therebetween. The substrate 10 is mounted on a motherboard 57 using solder 58. The motherboard 57 is fixed to the housing 50 at a predetermined position therein, which determines the position of the substrate 10 relative to the antenna-side end face 22 of the waveguide 20.

Figure 8B:
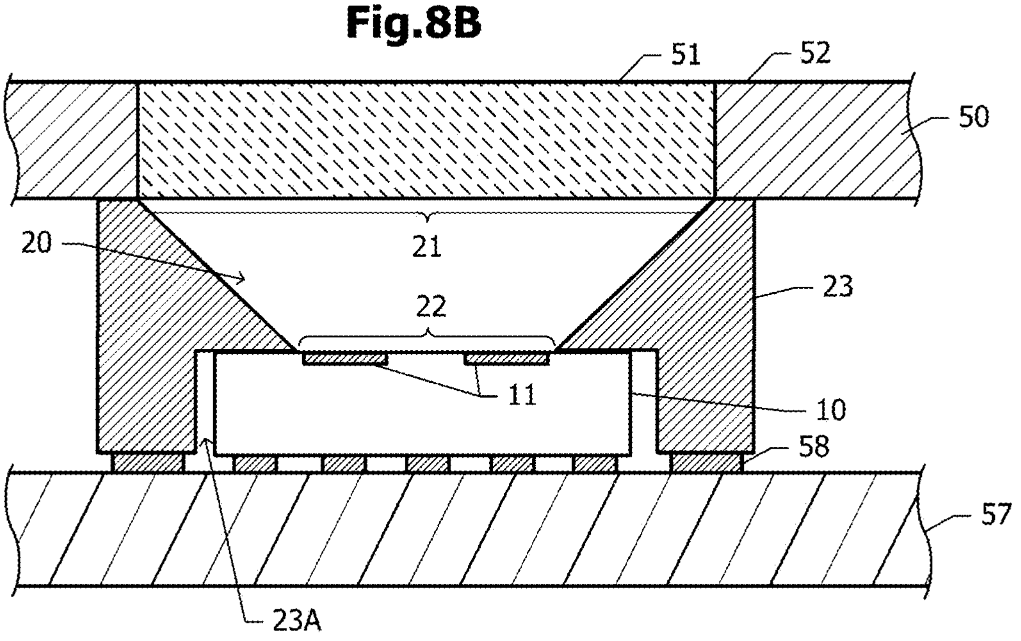

In the example illustrated in FIG. 8B, the substrate 10 and the conductive member 23 are mounted on the motherboard 57 using the solder 58. A recess 23A is formed in the conductive member 23. The recess 23A is seamlessly connected to the antenna-side end face 22 (i.e., the opening) of the waveguide 20. The substrate 10 is disposed inside the recess 23A. The motherboard 57 is accommodated in the housing 50 at a predetermined position, which thereby determines the position of the housing-side end face 21 of the waveguide 20 relative to the transmission window 51.

Figure 9:
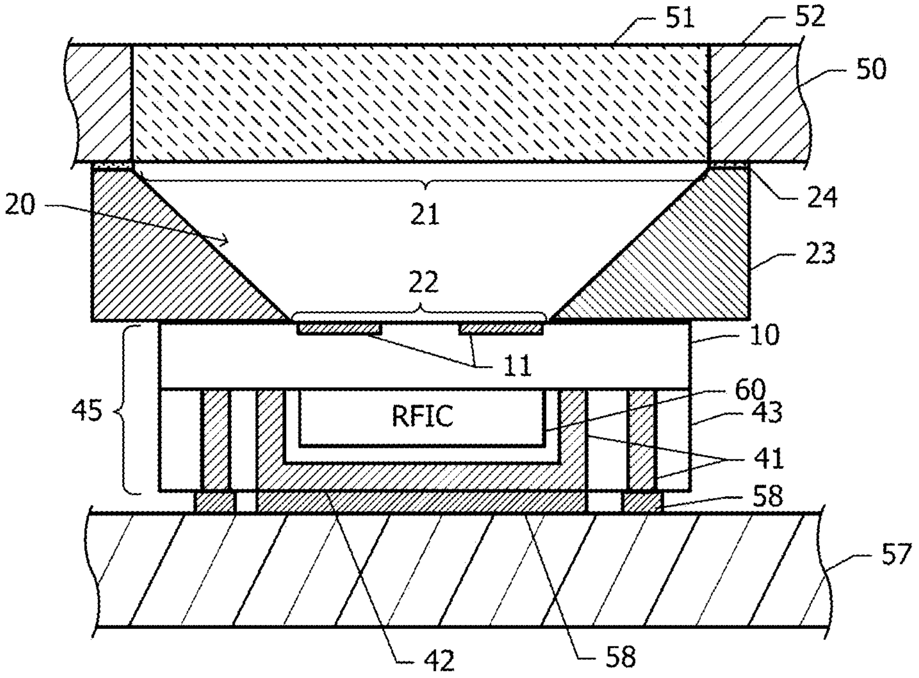
FIG. 9 is a cross-sectional view specifically illustrating an alternative structure of the antenna device of the first embodiment.

In the example illustrated in FIG. 9, an antenna module 45 is mounted on the motherboard 57. The antenna module 45 includes the substrate 10, the antenna elements 11, the high-frequency integrated circuit 60, a resin sealing layer 43, multiple conductive columns 41, and a conductive film 42. The high-frequency integrated circuit 60 is mounted on a surface of the substrate 10, the surface being opposite to the waveguide 20. The resin sealing layer 43 seals the high-frequency integrated circuit 60. The conductive columns 41 pierce through the resin sealing layer 43 in the thickness direction thereof. The conductive film 42 is disposed on a surface of the resin sealing layer 43, the surface being opposite to the motherboard 57, and is coupled to some of the conductive columns 41. The conductive film 42 and the conductive columns 41 that are not coupled to the conductive film 42 are fixed to the motherboard 57 using the solder 58.

The conductive columns 41 and the conductive film 42 serve as heat transfer paths. The heat generated in the high-frequency integrated circuit 60 is dissipated through the heat transfer paths to the motherboard 57. The conductive film 42 may be in contact with the top surface of the high-frequency integrated circuit 60 (the surface opposite to the substrate 10). This structure also can improve the heat dissipation characteristics. The system-in-package (SiP) device having a high-frequency integrated circuit and other components formed therein may be used in place of the high-frequency integrated circuit 60.

Second Embodiment

Next, an antenna device according to a second embodiment will be described with reference to FIGS. 10A and 10B. The descriptions of the same configurations as those of the antenna device of the first embodiment (see FIGS. 1A and 1B) will be omitted.

Figure 10A:
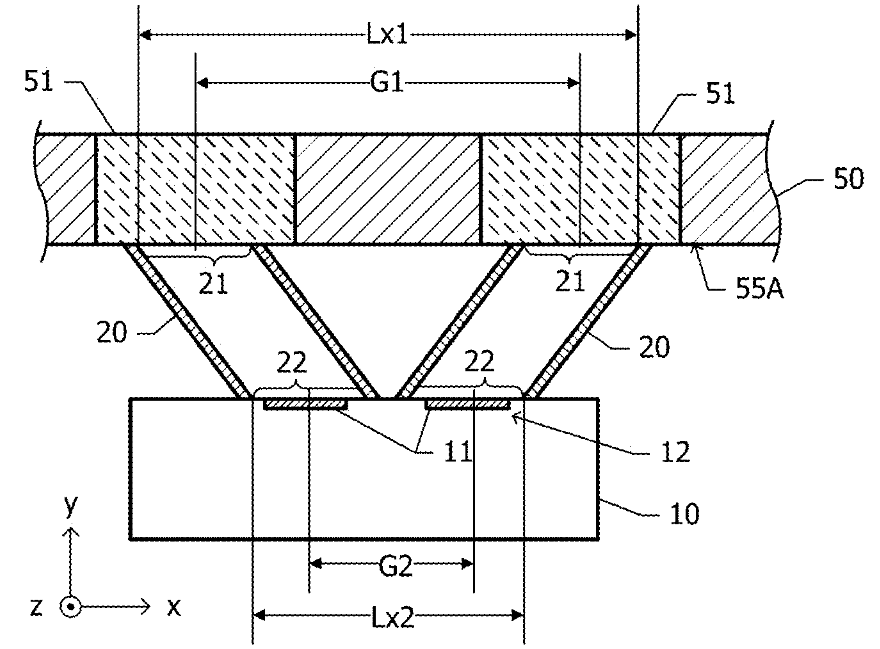
FIG. 10A is a cross-sectional view illustrating an antenna device according to a second embodiment.

FIG. 10A is a cross-sectional view illustrating the antenna device according to the second embodiment. In the first embodiment, a single waveguide 20 is coupled to multiple antenna elements 11 (see FIG. 1B). In the antenna device according to the second embodiment, on the other hand, multiple waveguides 20 are coupled to respective ones of the multiple antenna elements 11. For example, the antenna device of the second embodiment includes two antenna elements 11 and two waveguides 20, and the two waveguides 20 are coupled to the corresponding ones of the two antenna elements 11. The waveguides 20 are metallic waveguides. The transmission window 51 of the housing 50 is provided for each one of the waveguides 20.

The area of the cross section of each waveguide 20, the cross section extending in the direction, is constant from the antenna-side end face 22 to the housing-side end face 21. The two waveguides 20 extend obliquely from the antenna-side end face 22 toward the housing-side end face 21 in such a manner that the gap between the two waveguides 20 becomes greater as the gap comes closer to the housing-side end face 21. Regarding the two waveguides 20 coupled to respective antenna elements 11 that are arrayed side-by-side in the x direction, a gap G1 between respective housing-side end faces 21 in the x direction is greater than a gap G2 between respective antenna-side end faces 22 in the x direction. The term "gap" here refers to the distance between the geometric centers of the two waveguides 20. Also in this case, the length Lx1 between opposing ends of a plurality of the housing-side end faces 21 of the waveguides 20 in the x direction is greater than the length Lx2 between opposing ends of a plurality of the antenna-side end faces 22 of the waveguides 20 in the x direction, as is the case in the first embodiment (see FIG. 1A).

Figure 10B:
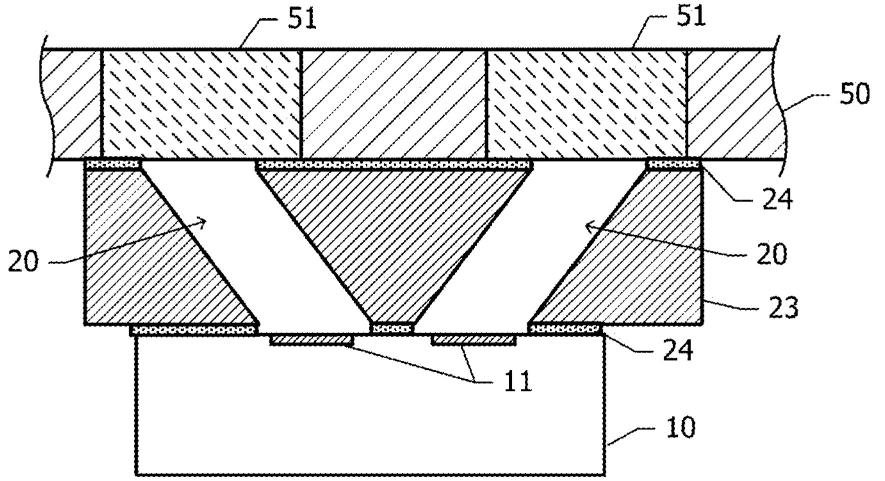
FIG. 10B is a cross-sectional view illustrating a specific structure of the antenna device of the second embodiment.

FIG. 10B is a cross-sectional view illustrating a specific structure of the antenna device of the second embodiment. Each one of two waveguides 20 is shaped as a cavity piercing through the conductive member 23. The conductive member 23 is fixed to the inside surface of the housing 50 with the adhesion layer 24 interposed therebetween. The substrate 10 is fixed to the conductive member 23 with the adhesion layer 24 interposed therebetween.

Next, advantageous effects of the antenna device according to the second embodiment are described. In the second embodiment, the housing-side end face 21 of each one of the waveguides 20 serves as a source of secondary waves. The area of a convex hull encompassing multiple secondary-wave sources is greater than the area of the array antenna 12 having multiple antenna elements 11. Accordingly, the gain of the array antenna 12 can be improved as is the case in the first embodiment.

In the first embodiment (see FIG. 1B), radio waves emitted by multiple antenna elements 11 are superposed in the single waveguide 20. This may interfere with directivity control. In the antenna device of the second embodiment, however, multiple secondary-wave sources are coupled discretely to respective ones of the antenna elements 11, which enables the phase of each secondary-wave source to be controlled independently. Accordingly, the directivity control can be performed more easily compared with the antenna device of the first embodiment.

In the first embodiment (see FIG. 1B), the cross section of the waveguide 20 is large, which tends to produce higher-mode waves inside the waveguide 20 easily. On the other hand, in the antenna device of the second embodiment, the cross section of each one of the waveguides 20 is small compared with that in the first embodiment, which can reduce the occurrence of higher-mode waves.

Figure 11:
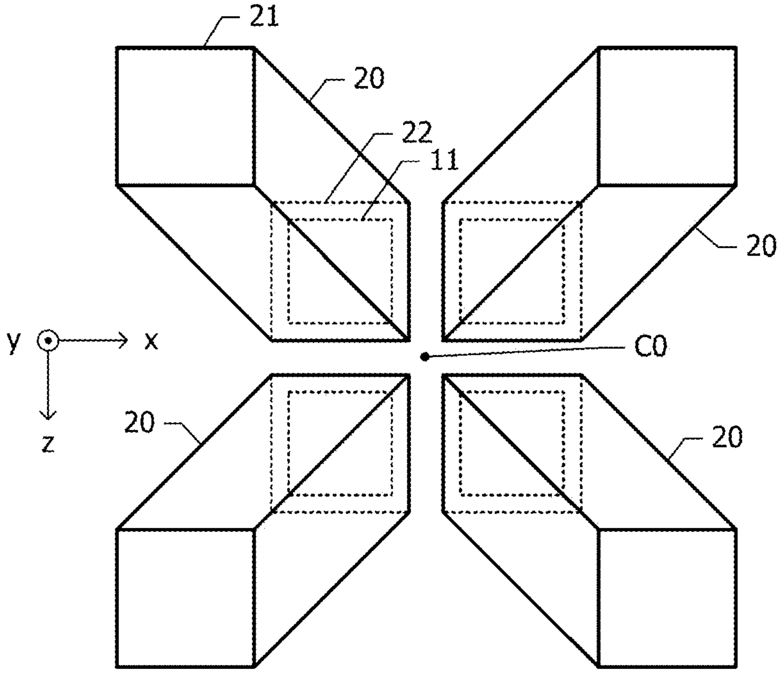
FIG. 11 is a view illustrating an arrangement of elements of an antenna device according to a variation of the second embodiment, the elements being arranged on the x-z plane.

Next, an antenna device according to a variation of the second embodiment is described with reference to FIG. 11. FIG. 11 is a view illustrating an arrangement of elements of an antenna device according to a variation of the second embodiment, in which the elements are arranged on the x-z plane. In the second embodiment (see FIG. 10A), multiple antenna elements 11 are arrayed side-by-side one-dimensionally in the x direction. On the other hand, in the variation illustrated in FIG. 11, multiple antenna elements 11 are arrayed in a matrix. For example, the antenna elements 11 are arrayed in 2×2 matrix with the rows extending in the x direction.

Multiple waveguides 20 are coupled to respective ones of the antenna elements 11. The waveguides 20 are the metallic waveguides. Each antenna element 11 is encompassed by the antenna-side end face 22 of the corresponding waveguide 20. The waveguides 20 extend obliquely from the antenna-side end faces 22 toward the housing-side end faces 21 in such a manner that the waveguides 20 become more distant from one another. The geometric center of the antenna side end faces 22 is denoted by C0. Assuming the waveguides 20 is viewed in the y direction, the housing-side end faces 21 of the waveguides 20 are translated from the corresponding antenna-side end faces 22 in directions away from the geometric center C0.

In the variation illustrated in FIG. 11, the area of a convex hull encompassing the housing-side end faces 21 of the multiple waveguides 20 is greater than the area of a convex hull encompassing the multiple antenna elements 11. Accordingly, the gain of the array antenna can be improved while an increase in the size of the antenna module is suppressed.

Third Embodiment

Next, an antenna device according to a third embodiment will be described with reference to FIG. 12. The descriptions of the same configurations as those of the antenna device of the first embodiment (see FIGS. 1A and 1B) will be omitted.

Figure 12:
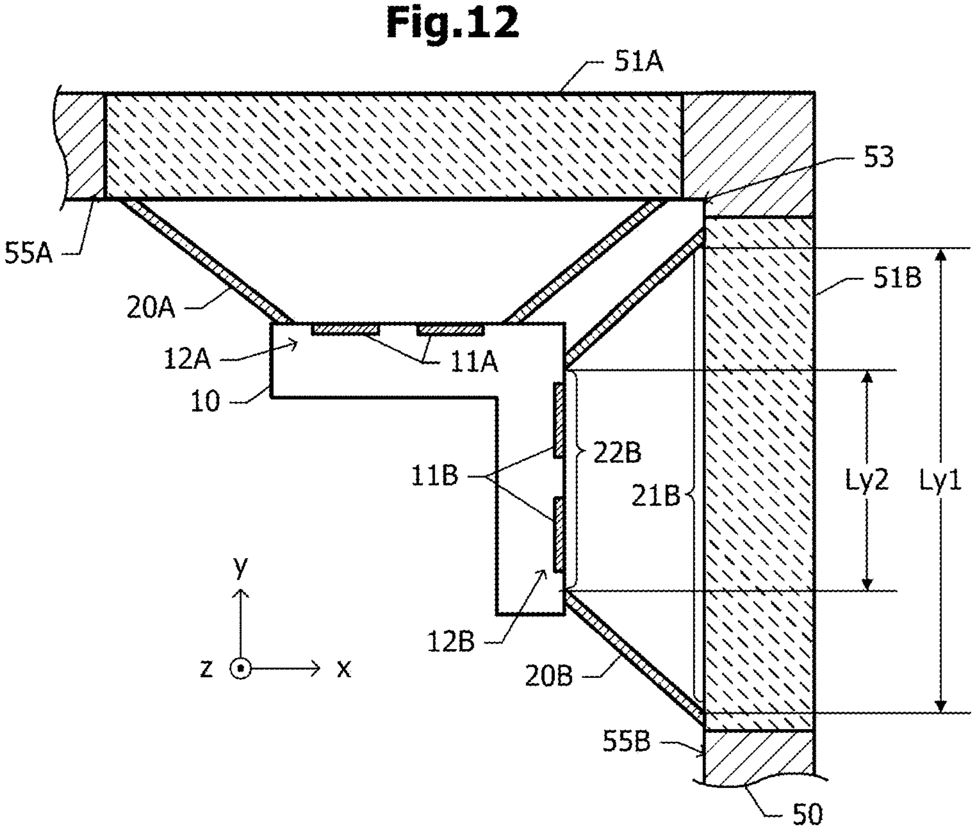
FIG. 12 is a cross-sectional view illustrating an antenna device according to a third embodiment.

FIG. 12 is a cross-sectional view illustrating the antenna device according to the third embodiment. A second region 55B of the inside surface of the housing 50 is connected to the first region 55A at a corner 53 that extends straight in the z direction. The corner 53 is not necessarily an angled corner at which two planes intersect. For example, the first region 55A and the second region 55B may be connected to each other by a curved surface having a predetermined curvature, or alternatively, the first region 55A and the second region 55B may be connected to each other by a flat surface inclining relative to both the first region 55A and the second region 55B. The antenna device of the third embodiment includes antenna elements that face the first region 55A and other antenna elements that face the second region 55B. The antenna elements facing the first region 55A are referred to as first antenna elements 11A, and the antenna elements facing the second region 55B are referred to as second antenna elements 11B.

For example, a substrate bent like the letter L is used for the substrate 10. For example, the second region 55B extends orthogonally to the x direction. The direction in which the second antenna elements 11B face the second region 55B is referred to as the "positive direction" along the x-axis.

The second antenna elements 11B are arrayed side-by-side in a direction parallel to an imaginary plane (x-y plane) that is orthogonal to the first region 55A, in other words arrayed side-by-side in a direction parallel to the second region 55B (i.e., in the y direction). A first array antenna 12A is formed of multiple first antenna elements 11A, and a second array antenna 12B is formed of multiple second antenna elements 11B. The first antenna elements 11A are arrayed one-dimensionally along a straight line extending in the x direction, and the second antenna elements 11B are arrayed one-dimensionally along another straight line extending in the y direction. Both straight lines are connected so as to form a shape like the letter L. The first antenna elements 11A and the second antenna elements 11B are regarded as forming one array antenna.

As are the array antenna 12, the waveguide 20, and the transmission window 51 in the first embodiment (see FIG. 1B), a first waveguide 20A and a first transmission window 51A are provided for the first array antenna 12A, and a second waveguide 20B and a second transmission window 51B are provided for the second array antenna 12B. The metallic waveguides or the dielectric waveguides are used for the first waveguide 20A and the second waveguide 20B.

A length Ly1 between one end and the opposite end of a housing-side end face 21B of the second waveguide 20B in the y direction is greater than a length Ly2 between one end and the opposite end of an antenna-side end face 22B in the y direction.

Next, advantageous effects of the antenna device according to the third embodiment are described.

In the third embodiment, the gain of the first array antenna 12A and the gain of the second array antenna 12B can be improved while an increase in the size of the antenna module is suppressed. The first array antenna 12A and the second array antenna 12B can operate as an antenna for beamforming, which can expand the coverage of the beamforming.

Next, a variation of the third embodiment is described.

In the antenna device of the third embodiment, the angle between the first region 55A and the second region 55B is a right angle at the corner 53. The angle between the first region 55A and the second region 55B, however, is not limited to a right angle. For example, the angle of the corner 53 may be an obtuse angle. The corner 53 may be a rounded corner. Alternatively, the corner 53 may be a surface inclining relative to both the first region 55A and the second region 55B, and the first region 55A and the second region 55B may be connected with the inclined surface being interposed therebetween. In the antenna device of the third embodiment, the substrate 10 is the L-shaped substrate. The substrate 10, however, may be formed of two separate flat substrates.

Fourth Embodiment

Next, an antenna device according to a fourth embodiment will be described with reference to FIG. 13. The descriptions of the same configurations as those of the antenna device of the third embodiment (see FIG. 12) will be omitted.

Figure 13:
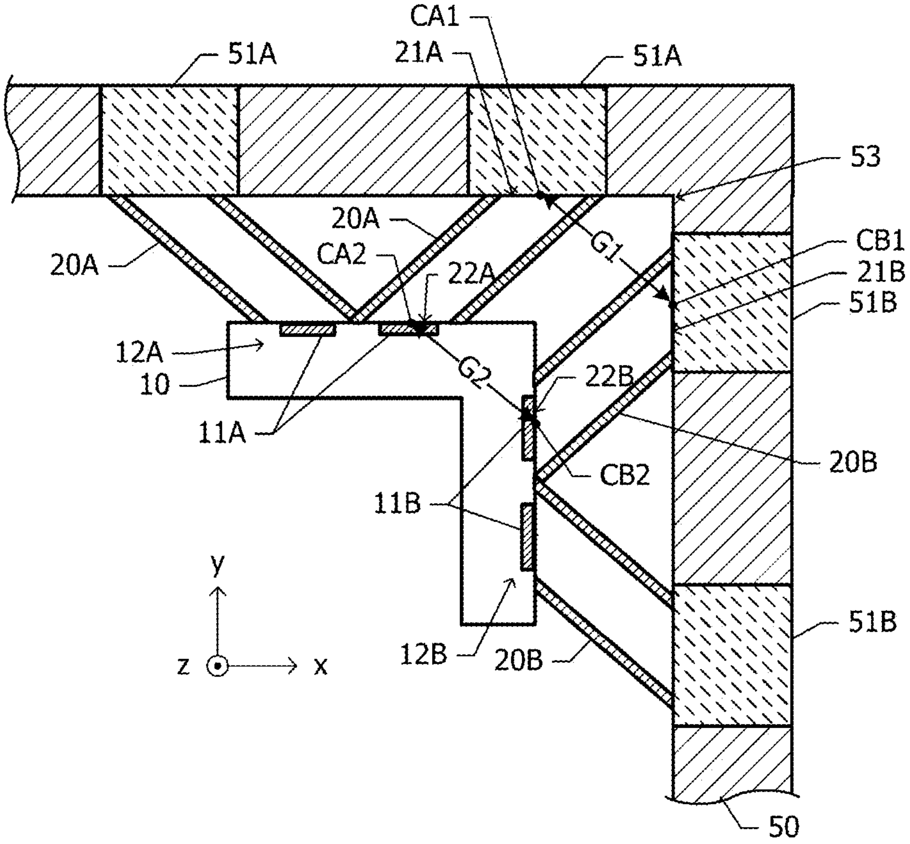
FIG. 13 is a cross-sectional view illustrating an antenna device according to a fourth embodiment.

FIG. 13 is a cross-sectional view illustrating the antenna device according to the fourth embodiment. In the antenna device of the third embodiment (see FIG. 12), a single first waveguide 20A is coupled to multiple first antenna elements 11A of the first array antenna 12A, and a single second waveguide 20B is coupled to multiple second antenna elements 11B of the second array antenna 12B. In the antenna device according to the fourth embodiment, on the other hand, multiple first waveguides 20A are coupled to respective ones of the multiple first antenna elements 11A of the first array antenna 12A. Similarly, multiple second waveguides 20B are coupled to respective ones of the multiple second antenna elements 11B of the second array antenna 12B. Multiple first transmission windows 51A are provided for respective first waveguides 20A, and multiple second transmission windows 51B are provided for respective second waveguides 20B.

The shapes and relative positions of the first array antenna 12A, the first waveguides 20A, and the first transmission windows 51A are the same as those of the array antenna 12, the waveguides 20, and the transmission windows 51 of the antenna device of the second embodiment (see FIG. 10A). The shapes and relative positions of the second array antenna 12B, the second waveguides 20B, and the second transmission windows 51B are the same as those of the array antenna 12, the waveguides 20, and the transmission windows 51 of the antenna device of the second embodiment (see FIG. 10A).

One of the first waveguides 20A positioned closest to the corner 53 extends substantially parallel to one of the second waveguides 20B positioned closest to the corner 53. The first waveguide 20A closest to the corner 53 has a housing-side end face 21A and an antenna-side end face 22A, and the geometric centers of those are denoted by CA1 and CA2, respectively. The second waveguide 20B closest to the corner 53 has a housing-side end face 21B and an antenna-side end face 22B, and the geometric centers of those are denoted by CB1 and CB2, respectively. In this case, a gap G1 between the geometric centers of CA1 and CB1 is substantially equal to a gap G2 between the geometric centers of CA2 and CB2.

Next, advantageous effects of the antenna device according to the fourth embodiment are described.

In the antenna device of the fourth embodiment, the gain of the first array antenna 12A and of the second array antenna 12B can be improved, the directivity can be controlled easily, and the occurrence of higher-mode waves can be reduced, as is the case for the antenna device of the second embodiment (see FIG. 10A). In addition, as is the case for the antenna device of the third embodiment (see FIG. 12), the first array antenna 12A and the second array antenna 12B can operate as the antenna for beamforming, which can expand the coverage of the beamforming.

Fifth Embodiment

Next, an antenna device according to a fifth embodiment will be described with reference to FIG. 14. The descriptions of the same configurations as those of the antenna device of the fourth embodiment (see FIG. 13) will be omitted.

Figure 14:
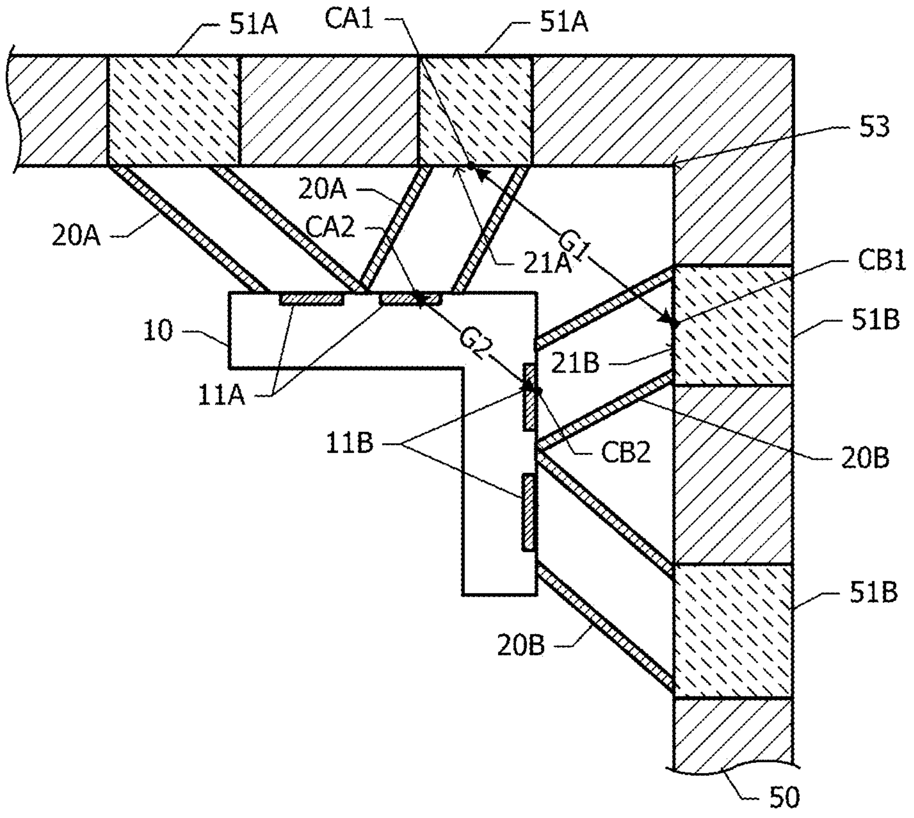
FIG. 14 is a cross-sectional view illustrating an antenna device according to a fifth embodiment.

FIG. 14 is a cross-sectional view illustrating the antenna device according to the fifth embodiment. In the antenna device of the fourth embodiment (see FIG. 13), the first waveguide 20A closest to the corner 53 and the second waveguide 20B closest to the corner 53 extend substantially parallel to each other. In the antenna device of the fifth embodiment, on the other hand, the first waveguide 20A closest to the corner 53 and the second waveguide 20B closest to the corner 53 extends so as to become distant from each other as they come closer to the inside surface of the housing 50 from the substrate 10. Accordingly, the gap G1 between the geometric centers of CA1 and CB1 is greater than the gap G2 between the geometric centers of CA2 and CB2.

Next, advantageous effects of the antenna device according to the fifth embodiment are described.

The gap G1 of the antenna device of the fifth embodiment is greater than the gap G1 of the antenna device of the fourth embodiment. As a result, the antenna gain can be improved assuming the housing-side end face 21A and the housing-side end face 21B of the first waveguide 20A and the second waveguide 20B, which are closest to the corner 53, serve as a source of secondary waves.

Sixth Embodiment

Next, an antenna device according to a sixth embodiment will be described with reference to FIG. 15. The descriptions of the same configurations as those of the antenna device of the second embodiment (see FIG. 10A) will be omitted.

Figure 15:
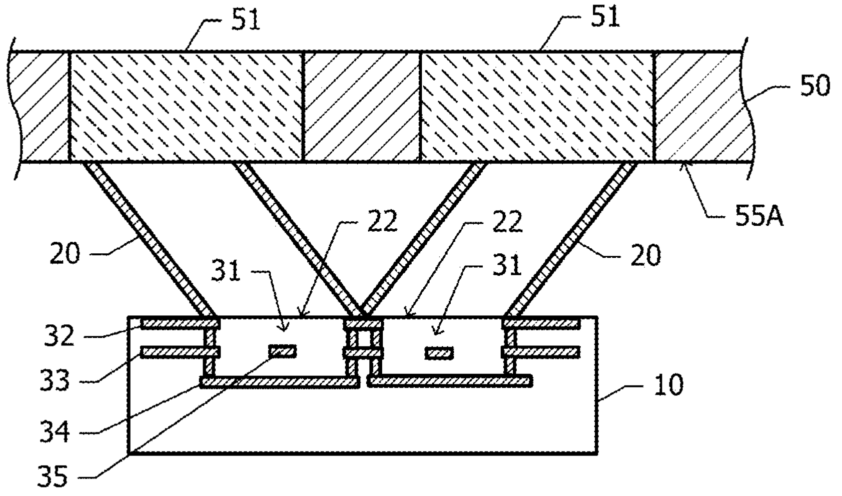
FIG. 15 is a cross-sectional view illustrating an antenna device according to a sixth embodiment.

FIG. 15 is a cross-sectional view illustrating the antenna device according to the sixth embodiment. In the antenna device of the second embodiment (see FIG. 10A), the antenna elements 11 are patch antennas. In the antenna device of the sixth embodiment, on the other hand, a microstrip line-waveguide converter 31 serves as an antenna element. An example of the structure of the microstrip line-waveguide converter 31 is described below.

Assuming the substrate 10 is viewed in plan, an end portion 35 of a microstrip line formed inside the substrate 10 is disposed within the antenna-side end face 22 of each waveguide 20. The end portion 35 of the microstrip line is coupled to each waveguide 20, and the coupling region serves as the microstrip line-waveguide converter 31. A ground plane 32 is formed on the surface of the substrate 10 near the waveguides 20, and a ground plane 33 is formed in the same layer as the microstrip line. A "back-short" element 34 is disposed in a layer deeper than the end portion 35 of the microstrip line. The microstrip line is coupled to the corresponding waveguide 20 in the microstrip line-waveguide converter 31, and high-frequency signals are transmitted through the microstrip line and further through the waveguide 20 and are emitted out of the housing 50.

Next, advantageous effects of the antenna device according to the sixth embodiment are described.

The shapes and arrangement of the waveguides 20 in the sixth embodiment are similar to those of the waveguides 20 of the antenna device of the second embodiment (see FIG. 10A). The area of the convex hull encompassing the sources of secondary waves becomes greater compared with the case in which multiple waveguides 20 extend to the first region 55A of the inside surface of the housing 50 in the direction normal to the first region 55A. Accordingly, the gain of the antenna device can be improved. Assuming each antenna element 11 is made of a resonant antenna, such as a patch antenna or a dipole antenna, the size of the antenna element is about one half of the wavelength of the radio wave in the operating frequency band. As a result, it is necessary to provide an area greater than about one half of the wavelength for each antenna element. The antenna device of the sixth embodiment, on the other hand, does not have such limitation, which leads to a reduction in the size of the antenna module.

Seventh Embodiment

Next, an antenna device according to a seventh embodiment will be described with reference to FIG. 16. The descriptions of the same configurations as those of the antenna device of the third embodiment (see FIG. 12) will be omitted.

Figure 16:
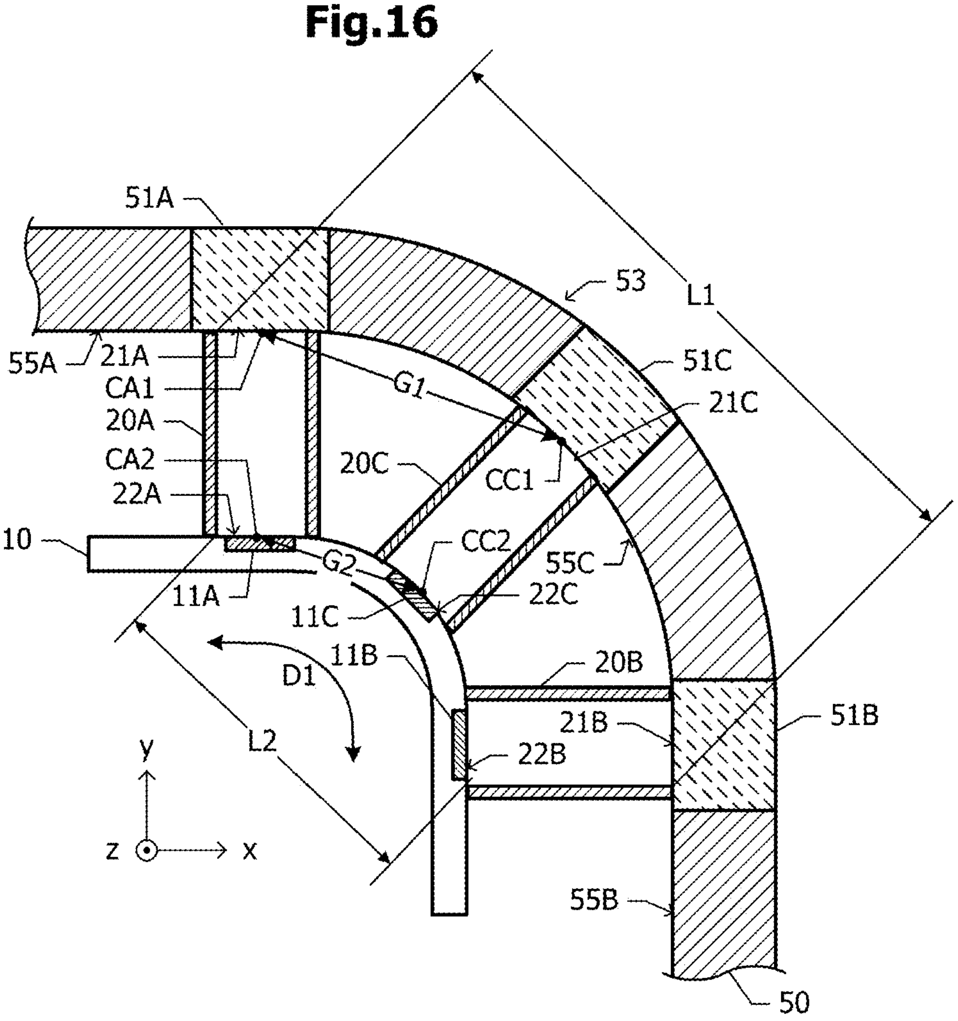
FIG. 16 is a cross-sectional view illustrating an antenna device according to a seventh embodiment.

FIG. 16 is a cross-sectional view illustrating the antenna device according to the seventh embodiment. In the antenna device of the third embodiment (see FIG. 12), the angle between the first region 55A and the second region 55B is approximately a right angle at the corner 53 of the housing 50. In the antenna device of the seventh embodiment, on the other hand, a curved surface is formed as an inside surface of the corner 53. The curved surface is referred to as a third region 55C. The outside surface of the housing 50 corresponding in position to the curved surface is also curved.

In the antenna device of the third embodiment (see FIG. 12), the substrate 10 is the L-shaped substrate that is bent substantially at a right angle. In the antenna device of the seventh embodiment, on the other hand, the substrate 10 is a substrate having a curved-surface region that opposes the third region 55C, which is the curved inside surface of the housing 50. A third antenna element 11C is disposed in the curved region of the substrate 10 so as to oppose the third region 55C.

A third waveguide 20C is coupled to the third antenna element 11C. The third waveguide 20C extends from the third antenna element 11C toward the third region 55C. In the antenna device of the third embodiment (see FIG. 12), each of the first waveguide 20A and the second waveguide 20B expands as they come closer to respective housing-side end faces 21A and 21B from the antenna-side end faces 22A and 22B. In the antenna device of the seventh embodiment, on the other hand, the cross sections of the first waveguide 20A, the second waveguide 20B, and the third waveguide 20C are constant as the cross-sections come closer to respective housing-side end faces 21A, 21B, and 21C from the antenna-side end faces 22A, 22B, and 22C. A third transmission window 51C that can transmit radio waves is formed at a position corresponding to the housing-side end face 21C of the third waveguide 20C.

The gap between the first waveguide 20A and the third waveguide 20C becomes greater as the gap comes closer to the housing-side end faces 21A and 21C from the antenna-side end faces 22A and 22C. To put it another way, the gap G2 is the distance between the geometric center CA2 of the antenna-side end face 22A of the first waveguide 20A and the geometric center CC2 of the antenna-side end face 22C of the third waveguide 20C, and the gap G1 is the distance between the geometric center CA1 of the housing-side end face 21A of the first waveguide 20A and the geometric center CC1 of the housing-side end face 21C of the third waveguide 20C. In this case, the gap G1 is greater than the gap G2. The same applies to the positional relationship between the second waveguide 20B and the third waveguide 20C.

The first antenna element 11A, the third antenna element 11C, and the second antenna element 11B are arrayed one-dimensionally along a curved line extending along the curved surface of the substrate 10 and form one array antenna. Assume that a first direction D1 refers to the extending direction of the curved line along which the first antenna elements 11A, the third antenna element 11C, and the second antenna element 11B are disposed. A length L2 refers to a length in the first direction D1 between one end and the opposite end of a plurality of the antenna-side end faces 22A, 22C, and 22B of the waveguides consisting of the first waveguide 20A, the third waveguide 20C, and the second waveguide 20B. A length L1 refers to a length in the first direction D1 between one end and the opposite end of a plurality of the housing-side end faces 21A, 21C, and 21B. In this case, the length L1 is greater than the length L2.

Next, advantageous effects of the antenna device according to the seventh embodiment are described.

In the seventh embodiment, the first waveguide 20A, the third waveguide 20C, and the second waveguide 20B serve as sources of secondary waves, and a region of the sources of secondary waves is greater in the first direction D1 than a region in which the first antenna element 11A, the third antenna element 11C, and the second antenna element 11B are disposed. Accordingly, the gain of the antenna device can be improved.

Next, an antenna device according to a variation of the seventh embodiment is described with reference to FIG. 17.

Figure 17:
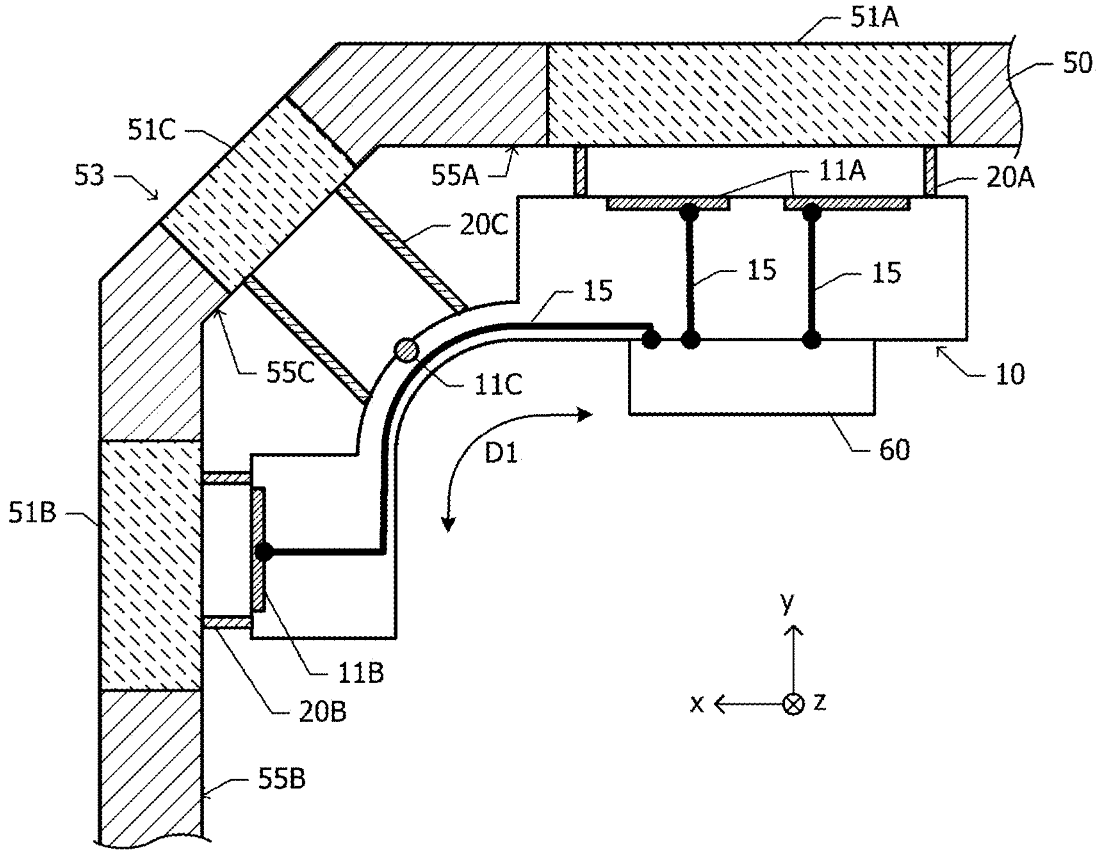
FIG. 17 is a cross-sectional view illustrating an antenna device according to a variation of the seventh embodiment.

FIG. 17 is a cross-sectional view illustrating the antenna device according to the variation of the seventh embodiment. In the antenna device of the seventh embodiment, the thickness of the substrate 10 is substantially constant. On the other hand, the antenna device according to the variation illustrated in FIG. 17 has a substrate of which the curved portion is thinner than the portions facing the first region 55A and the second region 55B. Such a substrate 10 can be manufactured, for example, by thinning a portion of a flat substrate having a constant thickness and bending the thinned portion. Alternatively, two flat substrates may be connected using a flexible circuit board, and the flexible circuit board may be bent.

In the antenna device of the seventh embodiment (see FIG. 16), the inside surface of the housing 50 at the corner 53 (i.e., the third region 55C) is the curved surface. In the antenna device of the variation of FIG. 17, on the other hand, the third region 55C is a flat surface inclined relative to both the first region 55A and the second region 55B. The first region 55A and the second region 55B are connected to each other with the inclined third region 55C being interposed therebetween.

Two first antenna elements 11A are arrayed side-by-side in the first direction D1 so as to oppose the first region 55A. The third antenna element 11C is, for example, a dipole antenna. The high-frequency integrated circuit (RFIC) 60 is mounted on a surface of the portion of the substrate facing the first region 55A, the surface being opposite to the surface facing the first region 55A. The high-frequency integrated circuit 60 is coupled to the first antenna elements 11A, the second antenna element 11B, and the third antenna element 11C using feeders 15 formed in the substrate 10.

Next, an antenna device of another variation of the seventh embodiment is described below.

In the antenna device of the seventh embodiment, the first antenna element 11A, the second antenna element 11B, and the third antenna element 11C are arrayed one-dimensionally in the first direction D1. These antenna elements, however, may be arrayed two-dimensionally.

Eighth Embodiment

Next, a communication device according to an eighth embodiment will be described with reference to FIG. 18. The communication device of the eighth embodiment includes the antenna device according to any one of the first to seventh embodiments and the variations thereof.

Figure 18:
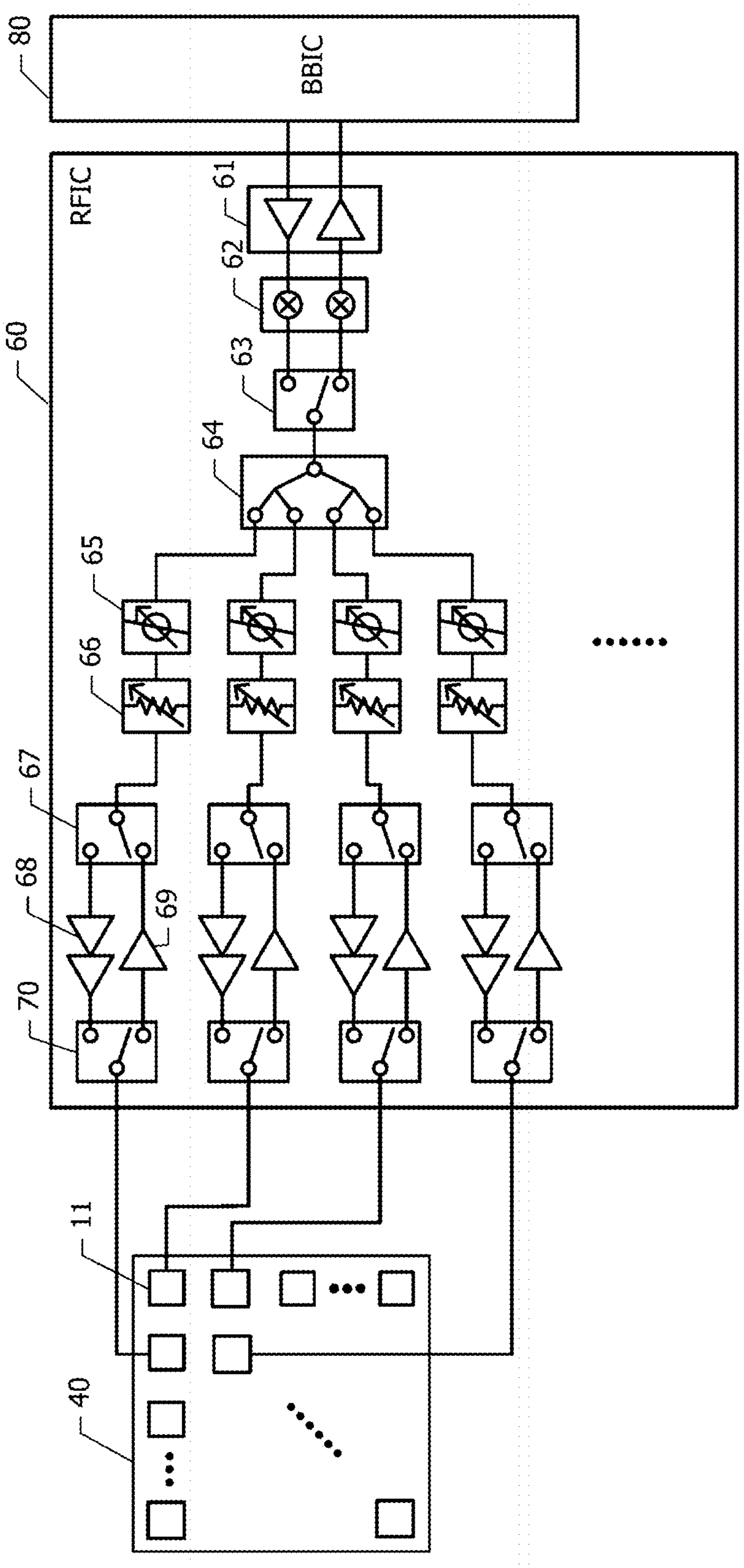
FIG. 18 is a block diagram illustrating a communication device according to an eighth embodiment.

FIG. 18 is a block diagram illustrating the communication device according to the eighth embodiment.

The communication device of the eighth embodiment includes a baseband integrated circuit (BBIC) 80, the high-frequency integrated circuit (RFIC) 60, and an antenna device 40. Any one of the antenna devices of the first to seventh embodiments and the variations thereof can be used for the antenna device 40. The antenna device 40 includes multiple antenna elements 11. For example, the antenna elements 11 may be the antenna elements 11 of the first embodiment (see FIGS. 1A and 1B), the first antenna elements 11A and the second antenna elements 11B of the third embodiment (see FIG. 12), the first antenna elements 11A, the second antenna element 11B, and the third antenna element 11C of the seventh embodiment (see FIG. 16).

The baseband integrated circuit 80 and the high-frequency integrated circuit 60 are accommodated in the same housing 50 as the housing 50 containing the antenna device 40 (see FIG. 1A and others). For example, the high-frequency integrated circuit 60 is mounted on the substrate 10 of the antenna device described in the variation of the seventh embodiment illustrated in FIG. 17.

The high-frequency integrated circuit 60 includes an intermediate-frequency amplifier 61, an up- and down-conversion mixer 62, a transmit-receive switch 63, and a power divider 64. The high-frequency integrated circuit 60 also includes phase shifters 65, attenuators 66, transmit-receive switches 67, power amplifiers 68, low-noise amplifiers 69, and transmit-receive switches 70.

First, the signal transmission function is described. An intermediate-frequency signal is sent from the baseband integrated circuit 80 and input into the up- and down-conversion mixer 62 via the intermediate-frequency amplifier 61. The up- and down-conversion mixer 62 up-converts the intermediate-frequency signal and generates a high-frequency signal. The high-frequency signal generated is input into the power divider 64 via the transmit-receive switch 63. The high-frequency signal is distributed by the power divider 64, and the distributed signals are input into the antenna elements 11 via the phase shifters 65, the attenuators 66, the transmit-receive switches 67, the power amplifiers 68, and the transmit-receive switches 70.

Next, the signal reception function is described. High-frequency signals received by multiple antenna elements 11 are input into the power divider 64 via the transmit-receive switches 70, the low-noise amplifiers 69, the transmit-receive switches 67, the attenuators 66, and the phase shifters 65. The combined high-frequency signal by the power divider 64 is input into the up- and down-conversion mixer 62 via the transmit-receive switch 63. The up- and down-conversion mixer 62 down-converts the high-frequency signal and generates an intermediate-frequency signal. The intermediate-frequency signal generated is input into the baseband integrated circuit 80 via the intermediate-frequency amplifier 61. Note that the direct conversion method can be adopted, whereby the up- and down-conversion mixer 62 down-converts the high-frequency signal directly into a baseband signal.

Next, advantageous effects of the antenna device according to the eighth embodiment are described.

The antenna device 40 included in the communication device of the eighth embodiment is the antenna device according to any one of the first to seventh embodiments and the variations thereof, which can improve the gain of the antenna device.

Note that the embodiments described above are merely illustrative and the configurations described therein can be partially replaced or combined with one another among different embodiments. The description of similar advantageous effects obtained from similar features in different embodiments is not repeated for each embodiment. The provision of the above embodiments are not intended to limit the present disclosure. It is apparent that those skilled in the art can easily alter, modify, combine, or the like, the features described herein.

REFERENCE SIGNS LIST

10 substrate
11 antenna element
11A first antenna element
11B second antenna element
11C third antenna element
12 array antenna
12A first array antenna
12B second array antenna
15 feeder
16 heat-dissipating member
20 waveguide
20A first waveguide
20B second waveguide
20C third waveguide
21 housing-side end face of waveguide
21A housing-side end face of first waveguide
21B housing-side end face of second waveguide
21C housing-side end face of third waveguide
22 antenna-side end face of waveguide
22A antenna-side end face of first waveguide
22B antenna-side end face of second waveguide
22C antenna-side end face of third waveguide
23 conductive member
23A recess formed in conductive member
24 adhesion layer
25, 26 screw
27 dielectric-waveguide support member
28 fixation member
28A bottom portion of fixation member
28B side-wall portion of fixation member
28C mounting portion of fixation member
29 screw
31 microstrip line-waveguide converter
32, 33 ground plane
34 "back-short" element
35 end portion of the microstrip line
40 antenna device
41 conductive column
42 conductive film
43 resin sealing layer
45 antenna module
50 housing
51 transmission window
51A first transmission window
51B second transmission window
51C third transmission window
52 metal wall
53 corner
55A first region of inside surface of housing
55B second region of inside surface of housing
55C third region of inside surface of housing
56 support portion
56A bottom portion
56B side-wall portion
57 motherboard
58 solder
60 high-frequency integrated circuit (RFIC)
61 intermediate-frequency amplifier
62 up- and down-conversion mixer
63 transmit-receive switch
64 power divider
65 phase shifter
66 attenuator
67 transmit-receive switch
68 power amplifier
69 low-noise amplifier
70 transmit-receive switch
80 baseband integrated circuit

The invention claimed is:

1. An antenna device comprising:
a housing;
an array antenna accommodated in the housing so as to face an inside surface of the housing and including multiple antenna elements that are arrayed in a first direction at least one-dimensionally; and
a waveguide coupled to the antenna elements of the array antenna and extending from the array antenna toward the inside surface of the housing, wherein
the waveguide has a housing-side end face facing the inside surface of the housing and an antenna-side end face facing the array antenna, and
a length from one end to an opposite end of the housing-side end face in the first direction is greater than a length from one end to an opposite end of the antenna-side end face in the first direction such that the housing-side end face serves as a source of secondary waves.

2. The antenna device according to claim 1, wherein
the antenna elements of the array antenna are patch antennas.

3. The antenna device according to claim 1, wherein
the waveguide is a metallic waveguide.

4. The antenna device according to claim 3, wherein
an inside of the metallic waveguide is filled with a dielectric material.

5. The antenna device according to claim 1, wherein
the waveguide is a dielectric waveguide,
the inside surface of the housing includes a first region and a second region that are connected to each other with a corner of the housing interposed therebetween,
at least one of the antenna elements of the array antenna faces the first region, and at least remaining one of the antenna elements of the array antenna faces the second region,
the waveguide includes a first waveguide and a second waveguide,
the first waveguide is coupled to the at least one of the antenna elements facing the first region, and
the second waveguide is coupled to the at least remaining one of the antenna elements facing the second region,
a substrate on which the array antenna is disposed; and
a support portion configured to fix the substrate and the waveguide to the housing, wherein
the support portion includes
a bottom portion disposed so as to have a gap from the first region of the inside surface of the housing, the array antenna facing the first region,
a side-wall portion extending from the bottom portion to the inside surface of the housing and being fixed to the housing, and
the waveguide and the substrate are disposed between the first region and the bottom portion,
the support portion is fixed to the housing using a fixation device, or the support portion is formed as an integral part of the housing.

6. A communication device comprising:
the antenna device according to claim 1; and a high-frequency integrated circuit accommodated in the housing of the antenna device and configured to supply high-frequency signals to the antenna elements of the array antenna.

7. An antenna device comprising:

a housing;

an array antenna accommodated in the housing so as to face an inside surface of the housing and including multiple antenna elements that are arrayed in a first direction at least one-dimensionally; and multiple waveguides coupled to respective ones of the antenna elements of the array antenna and extending from the respective ones of the antenna elements toward the inside surface of the housing, wherein in two of the waveguides coupled to respective two of the antenna elements that are positioned adjacently to each other in the first direction, a gap in the first direction between the housing-side end faces of the two of the waveguides is larger than a gap in the first direction between the antenna-side end faces thereof.

8. The antenna device according to claim 7, wherein the antenna elements of the array antenna are patch antennas.

9. The antenna device according to claim 7, wherein each antenna element of the array antenna includes an end portion of a microstrip line, and a coupling region between each antenna element of the array antenna and a corresponding one of the waveguides is a microstrip line-waveguide converter.

10. The antenna device according to claim 9, wherein the waveguide is a metallic waveguide.

11. The antenna device according to claim 10, wherein an inside of the metallic waveguide is filled with a dielectric material.

12. The antenna device according to claim 9, wherein the waveguide is a dielectric waveguide.

13. The antenna device according to claim 12, wherein the inside surface of the housing includes a first region and a second region that are connected to each other with a corner of the housing interposed therebetween, at least one of the antenna elements of the array antenna faces the first region, and at least remaining one of the antenna elements of the array antenna faces the second region, the waveguide includes a first waveguide and a second waveguide, the first waveguide is coupled to the at least one of the antenna elements facing the first region, and the second waveguide is coupled to the at least remaining one of the antenna elements facing the second region.

14. The antenna device according to claim 12, further comprising:

a substrate on which the array antenna is disposed; and a support portion configured to fix the substrate and the waveguide to the housing, wherein the support portion includes a bottom portion disposed so as to have a gap from the first region of the inside surface of the housing, the array antenna facing the first region, a side-wall portion extending from the bottom portion to the inside surface of the housing and being fixed to the housing, and the waveguide and the substrate are disposed between the first region and the bottom portion.

15. The antenna device according to claim 14, wherein the support portion is fixed to the housing using a fixation device, or the support portion is formed as an integral part of the housing.

16. The antenna device according to claim 15, further comprising:

a high-frequency integrated circuit mounted on a surface of the substrate, the surface being opposite to the waveguide, wherein the high-frequency integrated circuit is thermally coupled to the bottom portion.

17. The antenna device according to claim 16, further comprising:

a heat-dissipating member disposed between the high-frequency integrated circuit and the bottom portion.

18. The antenna device according to claim 12, further comprising:

a substrate on which the array antenna is disposed;

a motherboard on which the substrate is mounted; and an adhesion layer that fixes the waveguide to the housing, wherein attaching the motherboard to the housing causes the array antenna to come to a position at which the array antenna and the waveguide are coupled to each other.

19. The antenna device according to claim 12, further comprising:

a substrate on which the array antenna is disposed; and a motherboard on which the substrate and the waveguide are mounted at a position at which the waveguide and the array antenna are coupled to each other, wherein the motherboard is fixed to the housing.

20. A communication device comprising:

the antenna device according to claim 7; and a high-frequency integrated circuit accommodated in the housing of the antenna device and configured to supply high-frequency signals to the antenna elements of the array antenna.

* * * * *